(12) United States Patent
Jones

(10) Patent No.: US 12,518,194 B2
(45) Date of Patent: Jan. 6, 2026

(54) SURFACE CODES WITH DENSELY PACKED GAUGE OPERATORS

(71) Applicant: Google LLC, Mountain View, CA (US)

(72) Inventor: Nathan Cody Jones, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 22 days.

(21) Appl. No.: 18/514,579

(22) Filed: Nov. 20, 2023

(65) Prior Publication Data
US 2024/0346356 A1 Oct. 17, 2024

Related U.S. Application Data

(60) Provisional application No. 63/426,951, filed on Nov. 21, 2022.

(51) Int. Cl.
*G06N 10/70* (2022.01)
(52) U.S. Cl.
CPC .................... *G06N 10/70* (2022.01)
(58) Field of Classification Search
CPC ........................................................ G06N 10/70
See application file for complete search history.

(56) References Cited

U.S. PATENT DOCUMENTS

| | | | | |
|---|---|---|---|---|
| 9,978,020 | B1 * | 5/2018 | Gambetta | H03M 13/154 |
| 11,736,122 | B1 * | 8/2023 | Yoder | H03M 13/1125 |
| | | | | 714/755 |
| 2021/0019223 | A1 * | 1/2021 | Chamberland | G06N 10/70 |
| 2021/0374588 | A1 * | 12/2021 | Gidney | G06N 10/60 |
| 2023/0071000 | A1 * | 3/2023 | Higgott | H03M 13/1575 |
| 2024/0095573 | A1 * | 3/2024 | Griffin | G06N 10/70 |

FOREIGN PATENT DOCUMENTS

WO WO 2022139881 6/2022

OTHER PUBLICATIONS

D. Bacon, S. T. Flammia, A. W. Harrow and J. Shi, "Sparse Quantum Codes From Quantum Circuits," in IEEE Transactions on Information Theory, vol. 63, No. 4, pp. 2464-2479, Apr. 2017.*

(Continued)

*Primary Examiner* — Steve N Nguyen
(74) *Attorney, Agent, or Firm* — DORITY & MANNING P.A.

(57) ABSTRACT

The disclosure is directed to implementing a quantum error correction code via a quantum computer that includes a set of functional qubits and a set of non-functional qubits. A set of gauge operators is formed. A set of gauge operator combinations are determined from the set of gauge operators. Determining the set of gauge operator combinations may be based on a subset of functional qubits and a global sequence of each gauge operator. Each gauge operator combination has a composite operator that commutes with the composite operator of each other gauge operator combination. A set of composite stabilizers may be generated. Each composite stabilizer corresponds to a separate gauge operator combination. The QEC code may be executed, via the QCS, based on the set of composite stabilizers.

20 Claims, 11 Drawing Sheets

(56) References Cited

OTHER PUBLICATIONS

S. Bravyi, "Stabilizer subsystem codes with spatially local generators," 2010 IEEE Information Theory Workshop, Dublin, Ireland, 2010.*

V. V. Gayatri and P. K. Sarvepalli, "Decoding Topological Subsystem Color Codes and Generalized Subsystem Surface Codes," 2018 IEEE Information Theory Workshop (ITW), Guangzhou, China, 2018.*

Shota Nagayama et al, "Surface code error correction on a defective lattice," New J. Phys. Feb. 2017.*

S. Devitt et al, "Quantum Error Correction for Beginners," National Institute of Informatics and NTT Basic Research Laboratories, 2013.*

Bombin, "Gauge Color Codes: Optimal Transversal Gates and Gauge Fixing in Topological Stabilizer Codes", arXiv:1311.0879v6, Aug. 6, 2015, 10 pages.

International Search Report and Written Opinion for PCT/US2023/080576, mailed on Mar. 14, 2024, 6 pages.

Jones et al., "Gauge Color Codes in Two Dimensions", arXiv:1512.04193v1, Dec. 14, 2015, 15 pages.

* cited by examiner

SURFACE CODES WITH DENSELY PACKED GAUGE OPERATORS

PRIORITY CLAIM

The present application claims priority to U.S. Provisional Application No. 63/426,951, entitled "DECODING SUBSYSTEM SURFACE CODES WHERE GAUGE OPERATORS ARE DENSELY PACKED," filed on Nov. 21, 2022, the contents of which are herein incorporated in their entirety.

FIELD

The present disclosure relates generally to quantum computing and information processing systems, and more particularly to surface codes with densely packed gauge operators for quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b|1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to implementing a quantum error correction (QEC) code via a quantum computing system (QCS). The QCS may include a set of qubits that includes a set of functional qubits and a set of non-functional qubits that is disjoint from the set of functional qubits. One non-limiting method for implementing the QEC via the QCS, includes forming a set of gauge operators that are mapped around the set of non-functional qubits. Each gauge operator of the set of gauge operators includes a separate subset of the set of functional qubits and a global sequence that indicates an order for the gauge operator to operate on the subset of functional qubits. One or more pairs of gauge operators of the set of gauge operators are non-commuting operators. A set of gauge operator combinations are determined from the set of gauge operators. Determining the set of gauge operator combinations may be based on the subset of functional qubits and the global sequence of each gauge operator of the set of gauge operators. Each gauge operator combination of the set of gauge operator combinations includes at least two gauge operators from the set of gauge operators. Furthermore, each gauge operator combination has a composite operator that commutes with the composite operator of each other gauge operator combination of the set of gauge operator combinations. A set of composite stabilizers may be generated. Each composite stabilizer of the set of the composite stabilizers corresponds to a separate gauge operator combination of the set of gauge operator combinations. The QEC code may be executed, via the QCS, based on the set of composite stabilizers.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
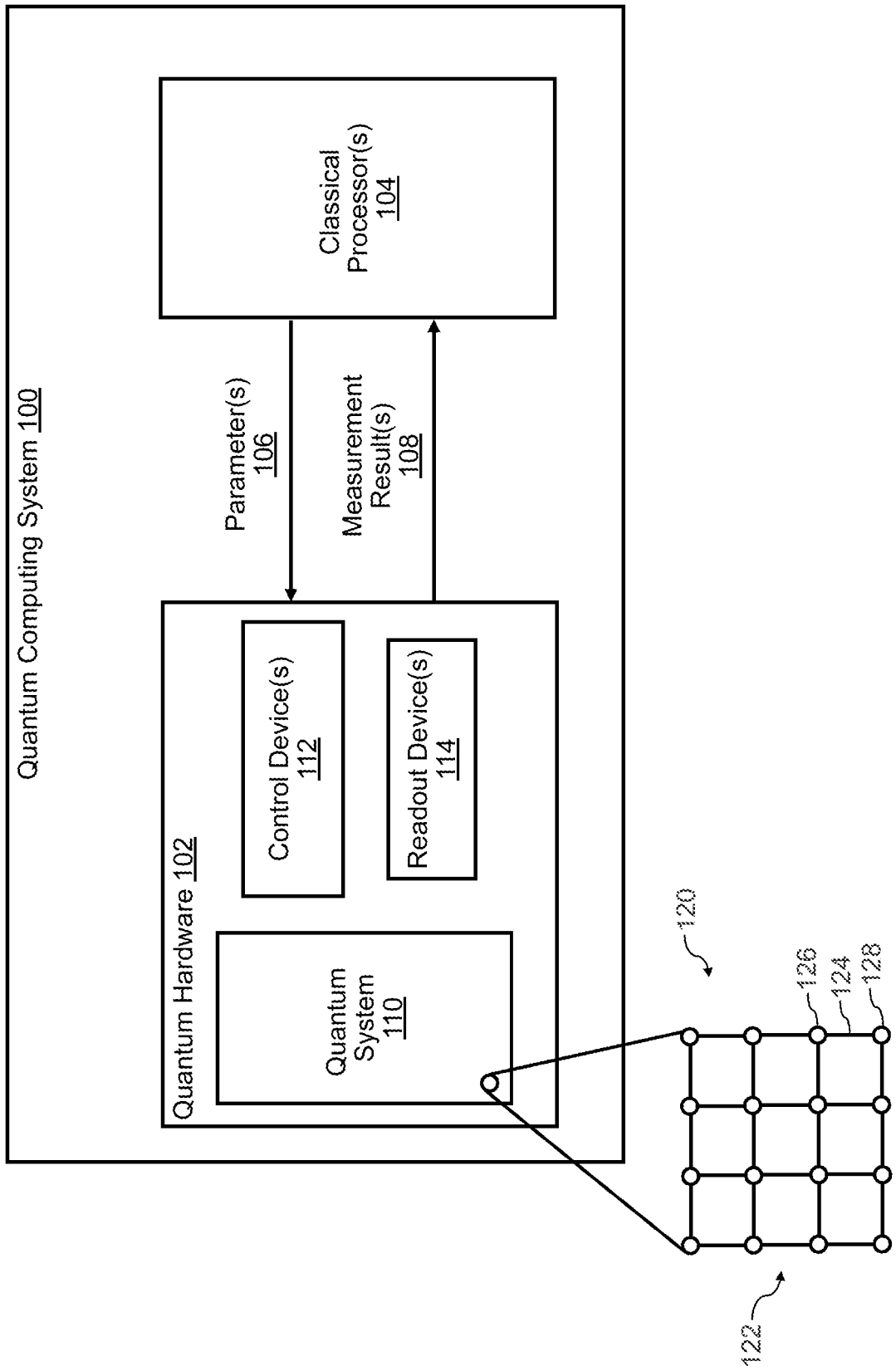
FIG. 1 depicts an example quantum computing system according to example embodiments of the present disclosure.

Example aspects of the present disclosure are directed to methods, architectures, and hardware configurations for implementing quantum error correction (QEC) codes (e.g., surface codes and surface-like codes) with densely packed gauge operators. As used herein, the "density" of packing gauge operators may be a density defined in terms of time (as opposed to spatial densities). Thus, the embodiments include temporally-dense gauge operators. Typical surface code implementations rely on a regular 2D grid of physical qubits free of defective or non-functional (e.g., non-operational) qubits. However, due to current fabrication limitations, at least some of the qubits in a 2D grid of qubits integrated on a quantum processor may be defective (e.g., non-functional). As such, a traditional surface code may be modified, such that the stabilizers are "mapped" around the defective or non-functional qubits, such that the modified surface code avoids the defective qubits. Such modified surface codes are sometimes referred to as a subsystem surface code, since the code "touches" only a subset of the qubits (e.g., the functional qubits) of the 2D grid.

Previous attempts for modifying surface codes with non-functional qubits have alternating layers of X-type and Z-type gauge operators. In these previous attempts, the separate layers of the X-type and Z-type stabilizers (formed from the layers of X-type and Z-type gauge operators respectively) are formed in an alternating fashion due to the anti-commutative properties of X and Z Pauli operators. These previous attempts are inefficient, because only a single layer (e.g., an X-type layer or a Z-type layer) of gauge operators may be measured per cycle. Detectors are formed via two consecutive measurements of a stabilizer. Thus, to detect either a X-type or Z-type error, at least three cycles of measurements are required. That is, for these previous attempts, it takes longer than the traditional two cycles of measurements to detect an error.

As discussed further throughout, a stabilizer is a single unit of a quantum error correcting code. A stabilizer specifies a quantum operator that has an expected eigenvalue. For instance, traditional surface codes (e.g., those implemented on a 2D grid of qubits that is free of defective or non-functioning qubits) have square and semicircle stabilizers. Each of the square and semicircle stabilizers come in two flavors: X-type and Z-type stabilizers. The square stabilizers involve four data qubits (and a single measure qubit), while the semicircle stabilizers involve two data qubits (and a single measure qubit). Thus, the quantum operator specified by a square X-type stabilizer is the operator XXXX (where X indicates a X-Pauli operator), while the quantum operator specified by a square Z-type stabilizer is the operator ZZZZ (where Z indicates a Z-Pauli operator). The quantum operator specified by a semicircle X-type stabilizer is the operator XX, while the quantum operator specified by a semicircle Z-type stabilizer is the operator ZZ. In traditional surface codes, the quantum operator specified by any particular stabilizer of the code commutes with the quantum operator specified by and other stabilizer of the code. A collection of stabilizers defines the ability of a quantum code to detect errors, by detecting changes in the eigenvalues of the stabilizers.

In contrast to a stabilizer, a gauge operator is a quantum operator that functions as a "piece" of a stabilizer. As discussed below, a square stabilizer where one of the four data qubits is a non-functional qubit may be "mapped" around the non-functional qubit to form a gauge operator involving the three functional qubits (e.g., XXX or ZZZ). Being a "part" of a stabilizer, the embodiments employ combinations of gauge operators to detect errors. Measurements of gauge operators (which are also implemented with circuits in a similar way as stabilizer measurements) will be individually random even when no error occurs. This means, for example, that comparing two consecutive measurements of the same gauge operator cannot reliably detect errors. However, detectors can be formed by combinations of measurements across multiple gauge operators, which is why they act as "pieces" of stabilizers.

The embodiments overcome the above inefficiencies by combining two or more gauge operators to form a "composite" stabilizer. A composite stabilizer is formed via a combination of two or more gauge operators. The two or more gauge operators (e.g., a gauge operator combination) that form a composite stabilizer are chosen in such a way that the "composite" quantum operator of the composite stabilizer commutes with the quantum operator of all the other stabilizers in the code. Because the composite quantum operator commutes with the other operators of the stabilizers, measurements of the X-type and Z-type stabilizers may be performed for each cycle of measurements. Accordingly, by being able to measure each gauge operator each cycle of measurements, the embodiments achieve error detection more efficiently than previous methods of implementing subsystem surface codes.

The embodiments include a method for implementing a QEC code, modified from the "surface code", that adapts to non-functional qubits (e.g. fabrication defects) more effectively than prior methods. The change to operation is how measurements are analyzed and compared to detect errors. Thus, an improved (e.g., more efficient) QEC code is achieved. The embodiments further include a method for generating a circuit control sequence for the quantum circuit that implements the improved quantum code.

A quantum computing system (QCS) may include a set of qubits that includes a set of functional qubits and a set of non-functional qubits that is disjoint from the set of functional qubits. One non-limiting method for implementing the QEC includes forming a set of gauge operators that are mapped around the set of non-functional qubits. Each gauge operator of the set of gauge operators includes a separate subset of the set of functional qubits and a global sequence that indicates an order for the gauge operator to operate on the subset of functional qubits. One or more pairs of gauge operators of the set of gauge operators are non-commuting operators. A set of gauge operator combinations are determined from the set of gauge operators. A gauge operator pair may include two or more gauge operators from the set of gauge operators (e.g., a first gauge operator and a second gauge operator). Determining the set of gauge operator combinations may be based on the subset of functional qubits and the global sequence of each gauge operator of the set of gauge operators. Each gauge operator combination has a composite operator that commutes with the composite operator of each other gauge operator combination of the set of gauge operator combinations. The composite operator of each gauge operator combination of the set of gauge operator combinations may be a product of each gauge operator of the gauge operator combination. A set of composite stabilizers may be generated. Each composite stabilizer of the set of the composite stabilizers corresponds to one gauge operator combination of the set of gauge operator combinations. The QEC code may be executed, via the QCS, based on the set of composite stabilizers.

The set of qubits may be arranged in a 2D grid of qubits. In such embodiments, the method may further include constructing a set of tiles on the 2D grid of qubits. Each vertex of each tile of the set of tiles may correspond to a qubit of the set of qubits. The set of tiles includes a set of square tiles and a set of semicircle tiles. Each tile of the set of tiles corresponds to an X-type operator or a Z-type operator such that the set of square tiles forms a checkerboard pattern of X-type operators and Z-type operators. Each vertex of each tile of the set of tiles may be assigned a global time position based on a set of circuit constraints. The global sequence of each gauge operator of the set of gauge operators may be based on the global time position of each vertex of each tile of the set of tiles. The global sequence of each gauge operator may be indicative of the circuit control sequence for the quantum circuit that implements the QEC. When a vertex of a square tile corresponds to a non-functional qubit of the set of qubits, the square tile may be transformed to a triangular tile that is mapped around the non-functional qubit. For instance, a vertex of a square tile that corresponds to a non-functional qubit may be "cut" or "snipped," such that the square tile is mapped around the non-functional qubit and the square tile is transformed to a triangular tile. The formerly square tile is removed from the set of square tiles and a set of triangular tiles is constructed. Each triangular tile of the set of triangular tiles corresponds to a separate gauge operator of the set of gauge operators. It should be noted that the embodiments are not limited to scenarios where the square tile is limited to a single non-functional qubit, and the embodiments are generalizable to more than one non-functional qubit in a tile. For instance, when there are two or three non-functional qubits within a square tile, the square tile may be reduced to a "line" or "point."

A set of square stabilizers may be formed based on the set of square tiles and the global time position of each vertex of each square tile of the set of square tiles. A set of semicircle stabilizers may be formed based on the set of semicircle tiles and the global time position of each vertex of each semicircle tile of the set of semicircle tiles. The QEC code may be executed, via the QCS, further based on the set of square stabilizers and the set of semicircle stabilizers. The method may further include assigning each gauge operator of the set of gauge operators a cycle offset based on a breadth-first search of a directed graph generated from the set of triangular tiles. The set of composite detectors may be generated based on the cycle offset of each triangular tile of the set of triangular tiles.

The method for generation the circuit control sequence for the quantum circuit that implements the QEC may include assigning a unique label to each gauge operator of the set of gauge operators based on the correspondence of the gauge operator to a triangular tile of the set of triangular tiles. The directed graph may be generated based on the global sequence of each gauge operator of the set of gauge operators. The directed graph includes a set of nodes and a set of directed edges between nodes of the set of nodes. A determination of each directed edge of the set of directed edges is described below. Each node of the set of nodes corresponds to a separate gauge operator of the set of gauge operators and is labeled with the unique label of the corresponding gauge operator. The directed graph may be traversed. Traversing the directed graph includes visiting each node of the set of nodes via the set of directed edges. Each gauge operator of the set of gauge operators may be assigned the cycle offset based on a correspondence between a direction of traversal and a direction of each directed edge of the set of directed edges. The cycle offset of each gauge operator of the set off gauge operators may be updated based on a detector template and a parity of the cycle offset of the gauge operator.

It should be noted that embodiments may be generalized to any stabilizer measurements, including flags. As discussed throughout, the embodiments are based on the order in which quantum circuits touch the data qubits (e.g., the global sequence of a gauge operator that indicates an order for the gauge operator to operate on the subset of functional qubits). The embodiments may further be generalized to circumstances where stabilizers can be reconstructed from gauge operators and other stabilizers, resets, or measurements, such as in surface-code movement or lattice surgery. Tiles can have any labeling of time positions for touching data qubits. Tiles (and thus stabilizers and gauge operators) are not restricted to "X-type" and "Z-type". They can be generalized to anything locally equivalent to X-type and Z-type. Local equivalence means applying a transformation that is a single-qubit Clifford gate at each data qubit. It can be shown that this preserves pairwise commutation among stabilizers, pairwise commutation between any stabilizer and gauge operator, and commutation-or-not among pairs of gauge operators, e.g., X/Y surface codes and/or XZZX surface codes. The methods here generalize to other circuit decompositions that use a two-qubit entangling operation, such as the controlled-Z gate or two-qubit parity measurement.

Another generalization of the embodiments to note is that is the description, the discussion is focused on a non-functional qubit being a data qubit of a stabilizer, and not a measure qubits. For instance, the scenario where a non-functional qubit corresponds to a "corner" of a square tile. However, the embodiments are not so limited, and the embodiments may be employed in scenarios where one of more measure qubits of one or more stabilizers is a non-functional qubit. Supporting qubits may be employed to measure the stabilizers or gauge operators as part of a circuit (and would be located at the center of a square tile). If one of these is non-functional, then in some embodiments, the approach is to deactivate the entire tile by treating all data qubits as non-functional may be employed.

Aspects of the present disclosure provide a number of technical effects and benefits. For instance, composite stabilizers are formed by combining gauge operators such into gauge operator combinations. The resulting operator of the gauge operator combination commutes with the operator of each of the other stabilizers. Thus, each stabilizer (X-type stabilizers and Z-type stabilizers) may be measured each cycle of the quantum circuit. Accordingly, errors may be detected more efficiently than previous attempts of subsystem surface codes, which must interleave the X-type and Z-type measurements.

FIG. 1 depicts an example quantum computing system 100. The system 100 is an example of a system of one or more classical computers and/or quantum computing devices in one or more locations, in which the systems, components, and techniques described below can be implemented. Those of ordinary skill in the art, using the disclosures provided herein, will understand that other quantum computing devices or systems can be used without deviating from the scope of the present disclosure.

The system 100 includes quantum hardware 102 in data communication with one or more classical processors 104. The classical processors 104 can be configured to execute computer-readable instructions stored in one or more memory devices to perform operations, such as any of the operations described herein. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits (e.g., qubits 120). In some implementations, the multi-level quantum subsystems can include superconducting qubits, such as flux qubits, charge qubits, transmon qubits, gmon qubits, spin-based qubits, and the like.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

In some implementations, the readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

In some embodiments, the quantum system 110 can include a plurality of qubits 120 arranged, for instance, in a two-dimensional grid 122. For clarity, the two-dimensional grid 122 depicted in FIG. 1 includes 4×4 qubits, however in some implementations the system 110 may include a smaller or a larger number of qubits. In some embodiments, the multiple qubits 120 can interact with each other through multiple qubit couplers, e.g., qubit coupler 124. The qubit couplers can define nearest neighbor interactions between the multiple qubits 120. In some implementations, the strengths of the multiple qubit couplers are tunable parameters. In some cases, the multiple qubit couplers included in the quantum computing system 100 may be couplers with a fixed coupling strength.

In some implementations, the multiple qubits 120 may include data qubits, such as qubit 126 and measurement qubits, such as qubit 128. A data qubit is a qubit that participates in a computation being performed by the system 100. A measurement qubit is a qubit that may be used to determine an outcome of a computation performed by the data qubit. That is, during a computation an unknown state of the data qubit is transferred to the measurement qubit using a suitable physical operation and measured via a suitable measurement operation performed on the measurement qubit.

In some implementations, each qubit in the multiple qubits 120 can be operated using respective operating frequencies, such as an idling frequency and/or an interaction frequency and/or readout frequency and/or reset frequency. The operating frequencies can vary from qubit to qubit. For instance, each qubit may idle at a different operating frequency. The operating frequencies for the qubits 120 can be chosen before a computation is performed.

FIG. 1 depicts one example quantum computing system that can be used to implement the methods and operations according to example aspects of the present disclosure. Other quantum computing systems can be used without deviating from the scope of the present disclosure.

Figure 2:
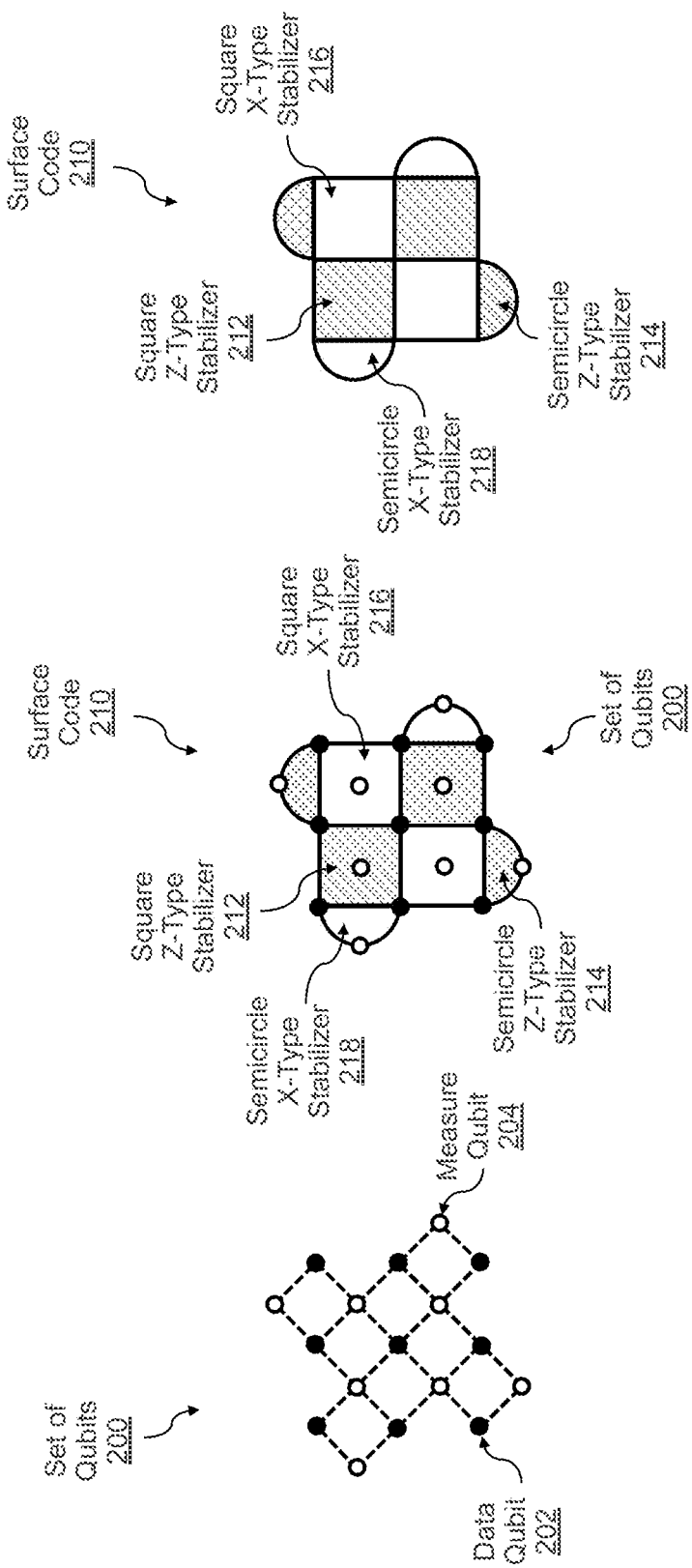
FIG. 2 provides a schematic view of features of a surface code, according to various embodiments.

FIG. 2 provides a schematic view of features of a surface code, according to various embodiments. More particularly, the "left-most" view of FIG. 2 shows a set of qubits 200. The set of qubits 200 is arranged in a 2D grid. This non-limiting example of a set of qubits 200 includes 17 qubits, represented by the filled (or closed) and unfilled (or open) "dots." Somewhat analogous to classical errors correcting codes employing each bit as either a "data" bit or a "parity-check" bit, quantum error codes employ each qubit of the set of qubits 200 as either a "data" qubit or a "measure" qubit. As explained below, a "data" qubit is somewhat analogous to a "data" bit of a classical code, in that quantum information is stored in the quantum states of the data qubits. "Measure" qubits are somewhat analogous to "parity-check" bits in classical codes, in that they are employed (via stabilizer operations and stabilizer measurements as explained below) to check the parity (both X-type and Z-type parities as explained below) of corresponding data qubits. The filled dots represent data qubits in a surface code (e.g., data qubit 202) and the unfilled dots represent measure qubits (e.g., measure qubit 204) in a surface code. Note that for purposes of clarity, the 2D grid of qubits is rotated by 45°. The qubits of the set of qubits 200 are enabled with "nearest neighbor" entangling interactions, and the dashed lines show qubit connectivity of each qubit with its nearest neighbors.

The "middle" view FIG. 2 shows a surface code 210 imposed on the set of qubits 200. The "right-most" view of FIG. 2 shows the surface code 210 without explicitly showing the set of qubits 200 (e.g., the set of qubits 200 is implied in the "right-most" view of FIG. 2). For the purposes of the follow discussion, a "surface code" (such as but not limited to surface code 210) is a quantum error correcting code. In a surface code (such as but not limited to surface code 210) qubits (e.g., the qubits of the set of qubits 210) are placed on a square lattice. In a surface code, entangling interactions (e.g., as shown by the dashed lines) between the qubits occur only between nearest neighbors. Surface codes may be implemented by a quantum circuit. Thus, as used herein, a "quantum circuit" is sequence of operations applied to implement a quantum computation, such as implementing a surface code. "Decoding" a surface code refers to the process of collecting error-detection measurements that are generated when running a quantum code (e.g. a surface code) and using those measurements to identify and correct errors. A quantum circuit may implement a quantum code (e.g., surface code 210) used measurements of a subset of the set of qubits 200 to detect errors. More specifically, a "detector" is a specific set of measurements (specified by a list of their positions in the circuit) whose combined parity has an expected value when no errors occur. Observing the unexpected parity indicates an error. Identifying detectors is a step in performing decoding, because the input to a decoder is the values of the detectors for the circuit being decoded.

A "stabilizer" is a single unit of a quantum error correcting code. More specifically, a stabilizer specifies a quantum operator that has an expected eigenvalue. The quantum operator specified by the stabilizer may be referred to as a stabilizer generator. A collection of stabilizers defines the ability of a quantum code to detect errors, by detecting changes in the eigenvalues of the stabilizers. Surface codes (such as but not limited to surface code 210) may employ X-type stabilizers (e.g., formed by a set of X-Pauli operators) operating on a subset of the set of qubits 200, as well as Z-type stabilizers (e.g., formed by a set of Z-Pauli operators) operating on a subset of the set of qubits 200. The eigenstates (and the corresponding eigenvalues) of X-type stabilizers correspond to the eigenstates (and corresponding eigenvalues) of X operators. The eigenstates (and the corresponding eigenvalues) of Z-type stabilizers correspond to the eigenstates (and corresponding eigenvalues) of Z operators. A quantum circuit is used to observe the eigenvalues of a stabilizer. More particularly, a stabilizer measurement is a measurement applied to the quantum circuit to observe the eigenvalue of the stabilizer. The eigenvalue of the stabilizer operator, which can be +1 or −1, is mapped onto a single-bit measurement outcome, which takes values 0 or 1. This is the mechanism by which a quantum code detects errors. Stabilizer eigenvalues are observed using circuits, and errors flip the outcome of one or more stabilizer measurements.

In FIG. 2, the light-shaded tiles (both square and semicircle tiles) represent X-type stabilizers and the dark-shaded tiles (both square and semicircle tiles) represent Z-type stabilizers. As noted above, the filled dots represent data qubits and the unfilled dots represent measure qubits, which are employed to measure the eigenvalues of the corresponding stabilizer. Thus, for surface code 210, four "flavors" of stabilizers exist: square X-type stabilizers (e.g., square X-type stabilizer 216), semicircle X-stabilizers (e.g., semicircle X-type stabilizer 218), square Z-type stabilizers (e.g., square Z-type stabilizer 212), and semicircle Z-stabilizers (e.g., semicircle Z-type stabilizer 214). Square stabilizers (e.g., both X-type and Z-type square stabilizers) include four data qubits (e.g., one at each of the four corners (or vertices) of the square tile) and one measure qubit at the center of the square tile. Semicircle stabilizers (e.g., both X-type and Z-type semicircle stabilizers) include two data qubits (e.g., one at each "antipodal" point of the semicircle tile) and one measure qubit at the center of the semicircle "curve." Each data qubit is included in at least one X-type stabilizer and at least one Z-type stabilizer. Each measure qubit is included in exactly one stabilizer (e.g., either an X-type or Z-type stabilizer). The square stabilizers form a "checkerboard" pattern of X-type and Z-type stabilizers, while one of the two ends of each row and column is "capped" via a semicircle stabilizer. The semicircle stabilizers may also be referred to as "ear" stabilizers.

A square Z-type stabilizer includes the quantum operator ZZZZ, where each of the four Z-Pauli operators is applied to a separate one of the four data qubits at the four vertices of the square tile. A semicircle Z-type stabilizer includes the quantum operator ZZ, where each of the two Z-Pauli operators is applied to one of the two data qubits at the two antipodal points of the semicircle tile. The order of the operators operating on the data qubits is discussed throughout.

For a given quantum circuit (e.g., a sequence of operations performed in an implementation of surface code 210), "detector formation" includes identifying the combinations of measurements that form detectors for that code. For example, if the same stabilizer is measured twice, the two measurement outcomes are compared. If no error occurs, then the outcomes will be the same. However, if the measurements are different, then an error has occurred somewhere (e.g., an error is detected). In this example, the detector is defined to be the parity of the two measurements of the same stabilizer. An even parity means no error was detected, and an odd parity means an error was detected. Determining which combinations of measurements form detectors requires careful analysis of the quantum code and its circuit.

A "gauge operator" is a quantum operator that functions as a "piece" of a stabilizer. It can detect errors when used in combination with other gauge operators. Measurements of gauge operators (which are also implemented with circuits similar to stabilizer measurement) will be individually random even when no error occurs. This means, for example, that comparing two consecutive measurements of the same gauge operator cannot reliably detect errors. However, detectors can be formed by combinations of measurements across multiple gauge operators, which is why they act as "pieces" of stabilizers. Identifying how to form detectors from which combinations of measurements requires careful analysis of the quantum code and circuit.

"Commuting" pairs of operators is a special property for a pair of quantum operators, such that reordering the operators has no effect-"apply A before B" has the same effect on the system, such as measuring stabilizer or gauge-operator eigenvalues, as instead "apply B before A". Note that not all pairs of quantum operators commute. The stabilizers in surface code 210 are constructed such that pairs of the quantum operators of a stabilizer commute. Gauge operators of the surface code 210 sometimes (but not all times) commute. That is, gauge operators may or may not commute. In examples that follow, the gauge operators of a given quantum code can be divided into subgroups such that members of each subgroup mutually commute, but two gauge operators from different subgroups do not commute.

A "subsystem surface code" is a type of surface code which employs combinations of stabilizers and gauge operators to detect errors. It is a property of subsystem codes that any pair of one stabilizer and one gauge operator will commute. That is, stabilizers and gauge operators may commute. Certain combinations of gauge operators can be combined to form a stabilizer. This occurs when, for a given subset of gauge operators, the product of the gauge operators in this subset forms an operator that commutes with all other stabilizers and gauge operators—hence this product operator is a stabilizer, although one that is composed of multiple gauge operators. Because there are combinations of gauge operators that form stabilizers, and because gauge-operator eigenvalues can be measured, it follows that the parity combination of measurements of the gauge operators that compose to a stabilizer will implement the measurement of that stabilizer that is the product of the gauge operators. Just as detectors are formed by the parity combination of two consecutive measurements of the same stabilizer, it follows that this procedure applies to two consecutive "composite" stabilizer measurements for a stabilizer composed of gauge operators. The composite stabilizer measurements are the parity combination of the constituent gauge-operator measurements.

As used herein, the terms "defective" qubit and "broken" qubit may be used interchangeably to refer to a non-functional qubit in the set of qubits 200. The embodiments include generating (or forming) a subsystem surface code for defective qubits. Generating a subsystem surface code for defective qubits includes modifying a surface code, originally composed only of stabilizers, to employ gauge operators in locations where a qubit in the square grid is non-functional. Each gauge operator is formed by "chopping away" part of a stabilizer where that stabilizer relied on a qubit that is non-functional. The result is a set of stabilizers and gauge operators that only depend on functional qubits in the provided grid. Detectors can be formed for measurements of both stabilizers and gauge operators.

Figure 3A:
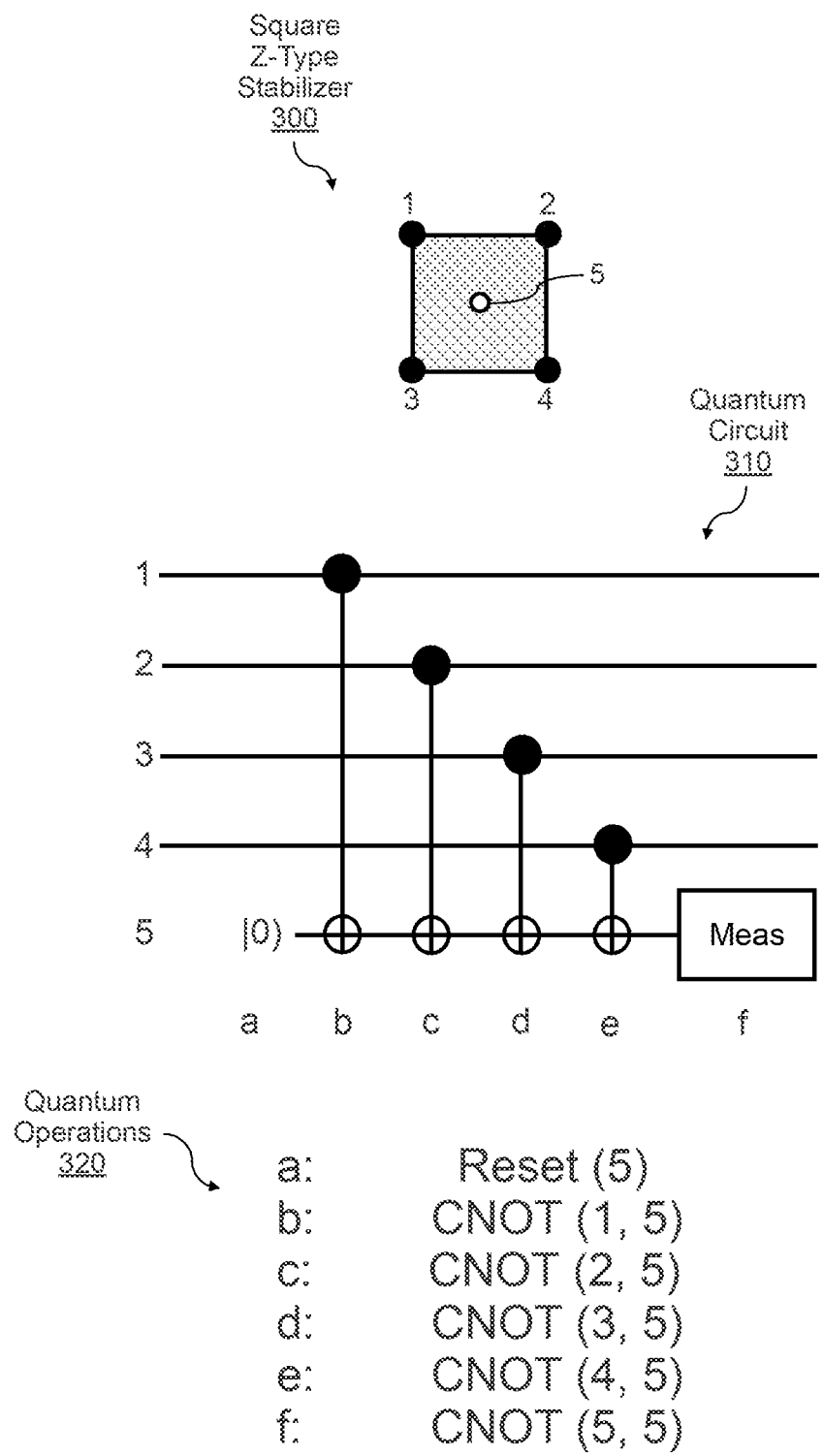
FIG. 3A provides a schematic view of features of a square Z-type stabilizer, according to various embodiments.

FIG. 3A provides a schematic view of features of a square Z-type stabilizer 300, according to various embodiments. The square Z-type stabilizer 300 (or square Z-type tile) may be similar to the square Z-type stabilizers of the surface code 210 of FIG. 2 (e.g., square Z-type stabilizer 212 of surface code 210). As such, square Z-type stabilizer 300 has four data qubits (e.g., the filled dots), each one of the four data qubits being located at one of the four corners (or vertices) of the square tile, and a measure qubit (e.g., the unfilled dot) in the middle of the square tile. Each of the qubits of the square Z-type stabilizer 300 has been labeled with an integer index. The data qubits being labeled with the integer indices 1, 2, 3, and 4, and the measure qubit being labeled with the integer index 5.

As noted in the discussion in conjunction with FIG. 2, error detection is performed with a quantum circuit that measures stabilizer eigenvalues, and repeated measurements of the same stabilizer are compared. FIG. 3A shows quantum circuit 310, which may be employed to measure the square Z-type stabilizer 300. Each horizontal line of the quantum circuit 310 corresponds to one of the five qubits of the square Z-type stabilizer 300. The integer indices 1-5 mapping to the five qubits indicates which horizontal line maps to each of the five qubits. The quantum circuit 310 includes a sequence of quantum logic gates (e.g., entangling CNOT gates), where the order of the sequence is important for the operation of the surface code (e.g., surface code 200 of FIG. 2). The quantum circuit 310 (e.g., including the ordering of the sequence of the logic gates) indicates how to measure the square Z-type stabilizer 300.

More particularly, the temporal axis of the quantum circuit 310 runs from left-to-right. Each time step in the operation of the quantum circuit 310 is labeled with one of the labels a, b, c, d, e, or f, where a indicates the first operation in the measurement of the square Z-type stabilizer 300 and f indicates the last operation. Quantum operations 320 show the operations of quantum circuit 310 in a pseudo-code format, where each line of the pseudo-code is labeled with the time-ordered labels: a, b, c, d, e, and f. At step a (of quantum circuit 310 and quantum operations 320), qubit 5 (e.g., the measure qubit) is reset to its ground state (e.g., an eigenstate of the Z-basis). At step b, an entangling CNOT gate is applied to data qubit 1 and the measure qubit 5, where qubit 1 is the control qubit. At step c, an entangling CNOT gate is applied to data qubit 2 and the measure qubit 5, where qubit 2 is the control qubit. At step d, an entangling CNOT gate is applied to data qubit 3 and the measure qubit 5, where qubit 3 is the control qubit. At step e, an entangling CNOT gate is applied to data qubit 4 and the measure qubit 5, where qubit 4 is the control qubit. At step f, the quantum state of the measure qubit 5 is measured. After step f, quantum circuit 310 (and thus quantum operations 320) may return to step a.

Note, in measuring the square Z-type stabilizer 300, the measure qubit is first reset to its ground state in the Z-basis. Then, each of the data qubits is entangled with the measure qubit via a CNOT operation, where the data qubit serves as the control qubit. After performing each of the CNOT entangling operations, the measure qubit is measured. As noted above, the order in which the entangling CNOT operations are performed is important. The labeling of the data qubits of the square Z-type stabilizer 300 as they are shown in FIG. 3A indicates the ordering of the entangling operations with the measure qubit.

Figure 3B:
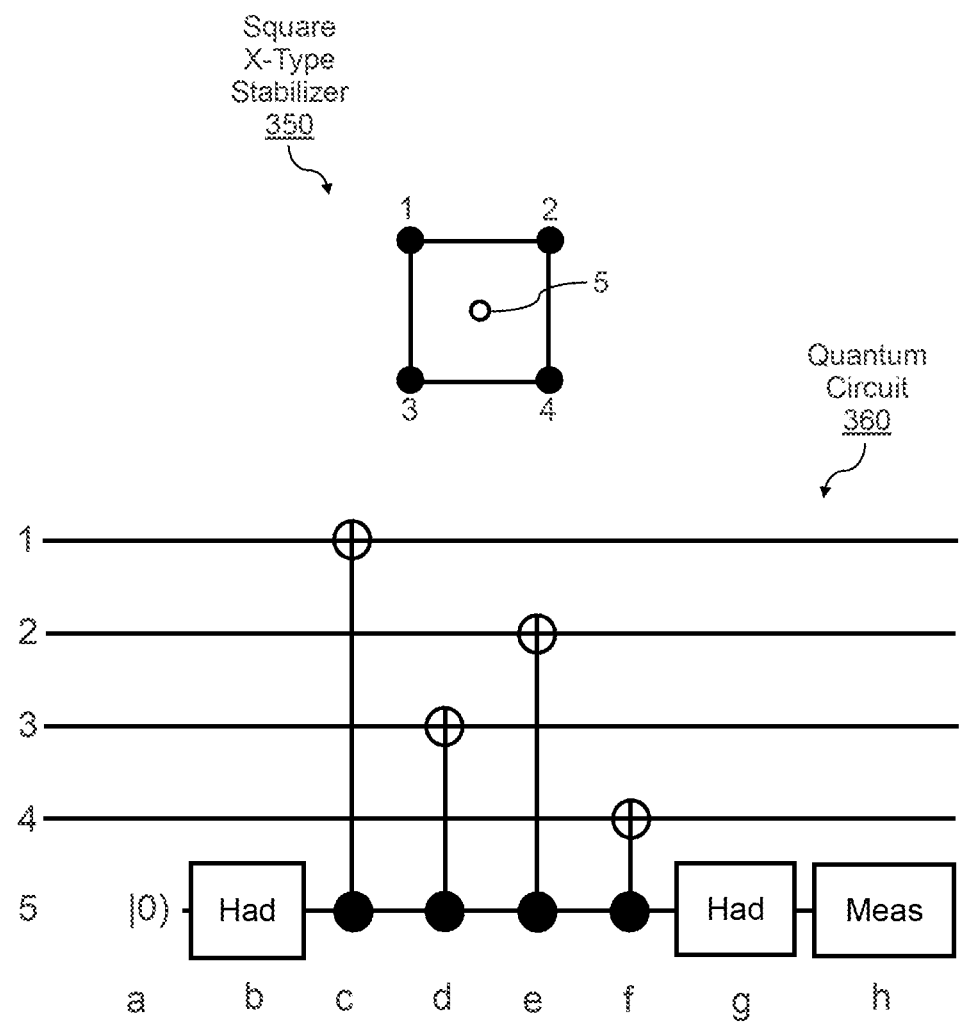
FIG. 3B provides a schematic view of features of a square X-type stabilizer, according to various embodiments.

FIG. 3B provides a schematic view of features of a square X-type stabilizer 350, according to various embodiments. The square X-type stabilizer 350 (or square X-type tile) may be similar to the square X-type stabilizers of the surface code 210 of FIG. 2 (e.g., square X-type stabilizer 216 of surface code 210). As such, square X-type stabilizer 350 has four data qubits (e.g., the filled dots), each one of the four data qubits being located at one of the four corners (or vertices) of the square tile, and a measure qubit (e.g., the unfilled dot) in the middle of the square tile. Each of the qubits of the square X-type stabilizer 350 has been labeled with an integer index. The data qubits being labeled with the integer indices 1, 2, 3, and 4, and the measure qubit being labeled with the integer index 5.

As noted in the discussion in conjunction with FIG. 2, error detection is performed with a quantum circuit that measures stabilizer eigenvalues, and repeated measurements of the same stabilizer are compared. FIG. 3B shows quantum circuit 360, which may be employed to measure the square X-type stabilizer 350. Each horizontal line of the quantum circuit 360 corresponds to one of the five qubits of the square X-type stabilizer 350. The integer indices 1-5 mapping to the five qubits indicates which horizontal line maps to each of the five qubits. The quantum circuit 360 includes a sequence of quantum logic gates (e.g., entangling CNOT gates), where the order of the sequence is important for the operation of the surface code (e.g., surface code 210 of FIG. 2). The quantum circuit 360 (e.g., including the ordering of the sequence of the logic gates) indicates how to measure the square X-type stabilizer 350.

More particularly, the temporal axis of the quantum circuit 360 runs from left-to-right. Each time step in the operation of the quantum circuit 310 is labeled with one of the labels a, b, c, d, e, f, g, or h, where a indicates the first operation in the measurement of the square X-type stabilizer 350 and h indicates the last operation. The reason why the square X-type stabilizer 350 has two additional operations, as compared to the square Z-type stabilizer 300 of FIG. 3A is that the entangling CNOT operations of the square X-type stabilizer 350 are started with the measure qubit being in an eigenstate of the X-basis (e.g., via a first Hadamard gate), rather than the Z-basis, and the that measure qubit is transformed back to the Z-basis prior to its measurement, via a second Hadamard gate. Quantum operations 370 show the operations of quantum circuit 360 in a pseudo-code format, where each line of the pseudo-code is labeled with the time-ordered labels: a, b, c, d, e, f, g, and h. At step a (of quantum circuit 360 and quantum operations 370), qubit 5 (e.g., the measure qubit) is reset to its ground state (e.g., an eigenstate in the Z-basis). At step b, a first Hadamard gate transforms the measure qubit to an eigenstate in the X-basis. At step c, an entangling CNOT gate is applied to data qubit 1 and the measure qubit 5, where qubit 5 is the control qubit. At step d, an entangling CNOT gate is applied to data qubit 2 and the measure qubit 5, where qubit 5 is the control qubit. At step e, an entangling CNOT gate is applied to data qubit 3 and the measure qubit 5, where qubit 5 is the control qubit. At step f, an entangling CNOT gate is applied to data qubit 4 and the measure qubit 5, where qubit 5 is the control qubit. At step g, a second Hadamard gate is applied to the measure qubit 5. At step h, the quantum state of the measure qubit 5 is measured. After step h, quantum circuit 360 (and thus quantum operations 370) may return to step a.

Note, in measuring the square X-type stabilizer 350, the measure qubit is first reset to its ground state in the Z-basis. Then, the measure qubit is transformed into an eigenstate of the X-basis via a first Hadamard gate. Each of the data qubits is then entangled with the measure qubit via a CNOT operation, where the measure qubit serves as the control qubit. Then the measure qubit is transformed again via a second Hadamard gate. After performing each of the CNOT entangling operations and the second Hadamard gate is applied to the measure qubit, the measure qubit is measured. As noted above, the order in which the entangling CNOT operations are performed is important. The labeling of the data qubits of the square X-type stabilizer 350 as they are shown in FIG. 3B indicates the ordering of the entangling operations with the measure qubit.

Quantum circuit may be employed to measure gauge operators. That is, in addition to the stabilizers, a similar construction of quantum circuits may be employed to measure gauge operators. For a given tile (e.g., an X-type tile or a Z-type tile), if the tile's operator commutes with the operators of the other tiles (e.g., of the surface code), then the tile may be employed as a stabilizer. Otherwise, the tile may be employed as a gauge operator if there is at least one other tile (of the surface code) that does not commute with the given tile. Accordingly, quantum circuit properties for stabilizer measurement tiles apply to gauge operator measurement tiles.

Figure 4A:
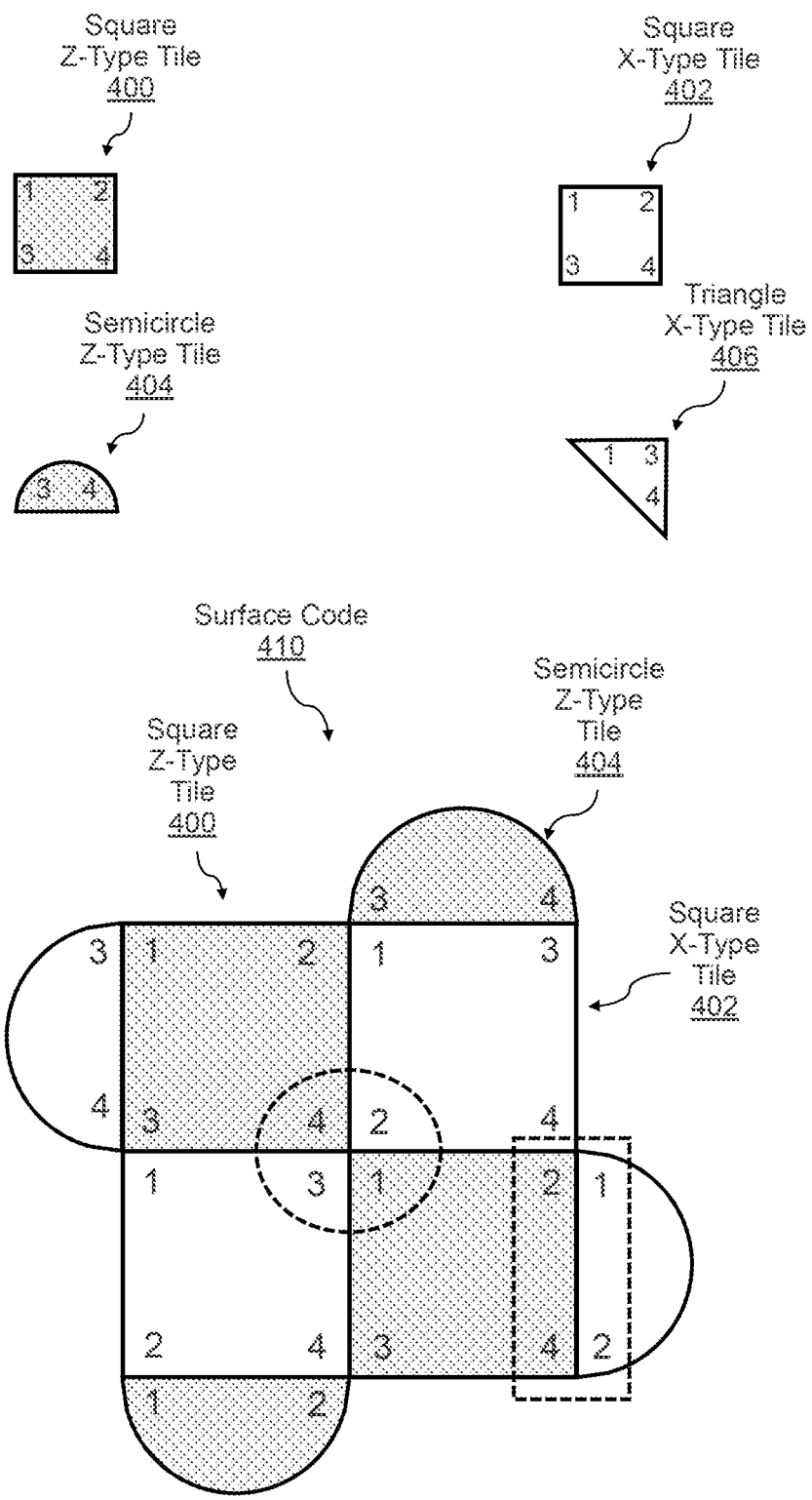
FIG. 4A illustrates various nomenclatures used herein to denote the ordering of stabilizer and gauge operator measurement tiles, according to various embodiments.

FIG. 4A illustrates various nomenclatures used herein to denote the ordering of stabilizer and gauge operator measurement tiles, according to various embodiments. The order in which a stabilizer (or gauge operator) measurement circuit "touches" the data qubits is important for a stabilizer measurement circuit (e.g., quantum circuit 310 of FIG. 3A and/or quantum circuit 360 of FIG. 3B). The embodiments here may generalize to quantum circuits that use different gates, as the embodiments depend only on the circuit order. In the following discussion, the order in which data qubits are touched by the circuit associated with a tile are indicated by placing numbers next to the vertices. The numbers describe a position in time, not a labeling of the qubits. For instance, FIG. 4A shows a square Z-type tile 400 and a square X-type tile 402. The order in which the corresponding measurement circuit (for the tiles) "touches" the data qubits are indicated by the numbers on the vertices. Note that the locations of the data qubits at the corners (or vertices) and the measure qubit at the center of the square Z-type tile 400 and the square X-type tile 402 are implied. For square Z-type tile 400, the order in which the circuit touches (e.g., via entangling CNOT gates) the data qubits is: (1) the upper left data qubit, (2) the upper right data qubit, (3) the lower left data qubit, and (4) the lower right data qubit. For square X-type tile 402, the order in which the circuit touches (e.g., via entangling CNOT gates) the data qubits is: (1) the upper left data qubit, (2) the lower left data qubit, (3) the upper right data qubit, and (4) the lower right data qubit. As discussed below, the embodiments may vary the "touching" of the data qubits depending on tile types and/or patterns of "broken" qubits.

Non-square tiles can represent either stabilizers or gauge operators, and thus can likewise be measured by a corresponding quantum circuit. For such non-square tiles, the order in which data qubits are touched by the stabilizer measurement circuit or the gauge measurement can be denoted by numbers in the "corners" (e.g., data qubit locations) of the tile. The time positions do not need to be sequential integers starting at 1, because each number refers to a "global" time position for the entire surface code. For instance, FIG. 4A shows a semicircle Z-type tile 404, touching two data qubits at the "antipodal" points (the data qubits are implied in FIG. 4A). The two time positions 3 and 4 are temporal global positions. FIG. 4A also shows a triangular X-type tile 406, touching three data qubits at the corners of the triangle. The three time positions 1, 3, and 4 are temporal global positions. Triangular tiles are discussed below, in conjunction with broken qubits.

FIG. 4A also shows surface code 410, which may be similar to surface code 210 of FIG. 2. As shown in FIG. 4A, the surface code 410 is comprised of various square and non-square tiles, such as but not limited to square Z-type tile 400 (e.g., two copies), square X-type tile 402 (e.g., two copies), semicircle Z-type tile 404 (e.g., two copies), and X-type semicircle tiles (e.g., two copies). The global time positions (or global time coordinates) of each of the data qubits is indicated by multiple global time positions. Note that each data qubit is part of multiple tiles (e.g., at least one X-type tile and at least one Z-type tile). Global time positions (e.g., such as those shown in tiles 400, 402, 404, and 406) indicate the order in which data qubits participate in multiple tiles. Because each data qubit is touched by multiple tiles (e.g., stabilizers), each data qubit is entangled with (e.g., touched by) multiple measure qubits, and thus each data qubit is marked with multiple global time positions. For instance, the "center" data qubit (e.g., the data qubit implied at the center of the dashed circle) participates in (e.g., or is touched by) four separate tiles. The center data qubit has a global time position of 1, with respect to the lower right square Z-type tile. The center data qubit has a global time position of 2, with respect to the upper right square X-type tile (e.g., square X-type tile 402). The center data qubit has a global time position of 3 with respect to the lower left square X-type tile. The center data qubit has a global time position of 4, with respect to the upper left square Z-type tile (e.g., square Z-type tile 400).

Note that there are constraints on the construction of the global time positions. One such constraint is the avoidance of gate "collisions." As shown in FIG. 4A, the construction of the global time positions for the data qubits in surface code 410 avoids gate "collisions." That is, in the embodiments, no two gates can act on the same (date or measure) qubit at the same time. This means that two-qubit gates must be scheduled such that: (1) within a tile, the data qubits at the corners are touched at different times, ensuring no collisions on the center measure qubit, and (2) for each data qubit at a vertex shared by several tiles, no two tiles touch that data qubit at the same time. For any pair of tiles A and B that overlap on two data qubits (e.g., the square Z-type tile 400 and the square X-type tile 402), one tile (e.g., the square X-type tile 402) must touch both qubits before the other (e.g., the square Z-type tile 400). For example, either A touches both overlapped qubits before B touches either, or else B touches both overlapped qubits before A touches either. Note that some choices of circuit order may have better performance than others, but the embodiments herein cover all valid choices circuit order.

A quantum circuit implementing the circuit order (e.g., as indicated by the global time positions) has valid global time positions because: (1) at each vertex, where multiple tiles touch the same data qubit, each time in the corner of the tiles is unique. The center qubit is encompassed by dashed circle as an example, and (2) where any two tiles overlap on two data qubits, one tile touches both data qubits before the other tile touches either of these two data qubits. For example, the square Z-type tile at lower-right and the semicircle X-type tile at lower-right overlap on two qubits, encompassed by dashed rectangle. The semicircle X-type tile touches these data qubits in times 1 and 2, while the square Z-type tile touches them, respectively, in times 2 and 4. The semicircle X-type tile touches both data qubits in the overlap before the square Z-type tile touches either.

Figure 4B:
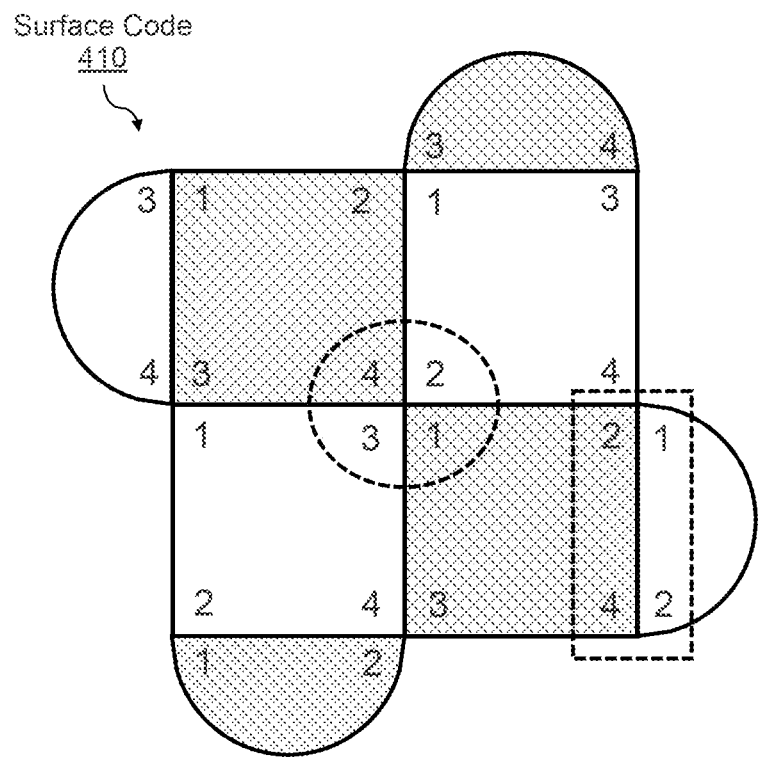
FIG. 4B demonstrates that the temporal ordering of a quantum circuit implementing a surface code need not be unique, according to various embodiments.
Figure 4B:
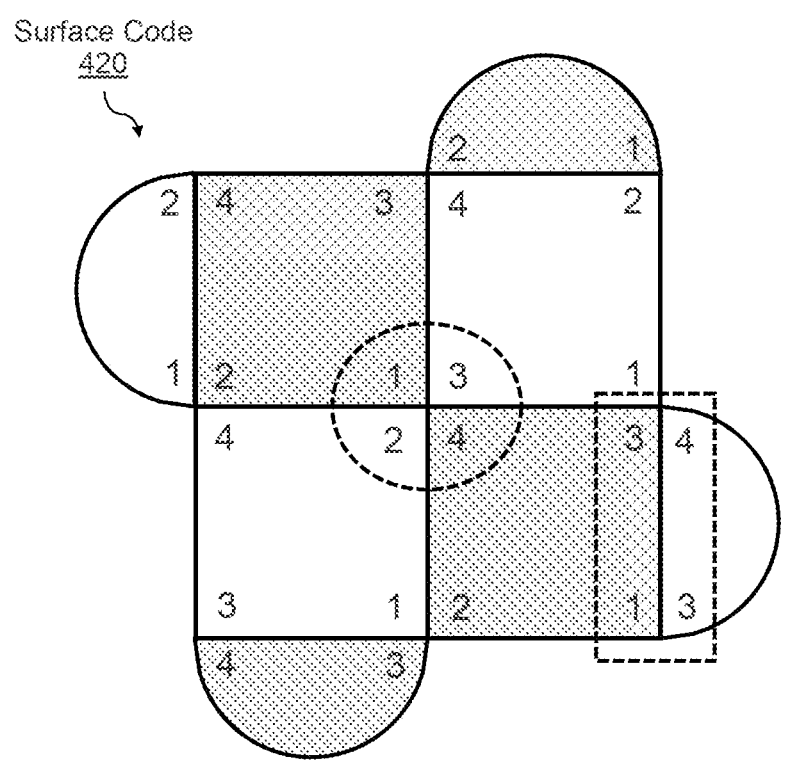

FIG. 4B demonstrates that the temporal ordering of a quantum circuit implementing a surface code need not be unique, according to various embodiments. FIG. 4B shows the surface code 410 of FIG. 4A. FIG. 4B further shows an alternative surface code 420, with an alternative temporal ordering of the global time positions of the data qubits. Both surface code 410 and surface code 420 have valid ordering for touching the data qubits (e.g., both surface codes 410/420 satisfy the constraints discussed above). The embodiments herein generalize to other circuit decompositions that use a two-qubit entangling operation, such as the controlled-Z gate or two-qubit parity measurement. The embodiments include such generalizations.

The embodiments include descriptions on how to measure gauge operators more frequently, and hence detect errors better, in a subsystem surface code for defective qubits. The embodiments provide improved performance of a quantum code in the presence of defective (e.g., broken) qubits, such as may arise from fabrication defects or disconnected wiring to send control signals to qubits. More specifically, some embodiments pack gauge-operator measurements more densely in time than has been previously achieved. The embodiments incorporate this change into detector formation so that decoding can be performed. Some embodiments include both (1) modified quantum circuits and (2) modified detector formation being implemented together.

As mentioned above, a previous way to form detectors is to compare two consecutive measurements of the same stabilizer. However, with gauge operators, it is possible to form a stabilizer from some combination of two or more gauge operators. Hence, knowing which combinations of gauge operators combine to form a stabilizer, one can form a detector by combinations of measurements that are the gauge operators combining to form the same stabilizer, consecutive in the circuit. This detector may be composed of four or more measurements—twice as many as there are gauge operators that combine to form the stabilizer.

Forming a stabilizer from two or more gauge operators may depend on knowing which gauge-operator measurements can be safely combined. Previous attempts have split gauge operators into two sets, such that the elements in each set mutually commute. These sets may be identified by the "Pauli type" of the gauge operators. For example, all gauge operators where the non-identity Pauli terms are X will mutually commute. And likewise, all gauge operators where the non-identity Pauli terms are Z will mutually commute. However, an X-type gauge operator and a Z-type gauge operator might not commute, depending on whether they overlap in an even or odd number of qubits.

Forming detectors from gauge operators depends on being able to combine gauge operators that form a stabilizer. This may be possible if there is no interfering gauge operator of another type that does not commute with the gauge operators composing the stabilizer. Previous attempts to for a stabilizer alternate between measuring X-type and Z-type gauge operators. Because all gauge operators of X-type are measured at once, and no Z-type gauge operators occurs in between, it is guaranteed that one can combine X-type gauge operators to form X-type stabilizers. Likewise, when measuring Z-type gauge operators with no interfering X-type gauge operators, one can form Z-type stabilizer readily.

These previous attempts often suffer because, while stabilizers are measured in every cycle of the circuit, each gauge operator is measured once every other cycle. This means that the stabilizers composed of gauge operators are formed every other cycle of measurement. In turn, this means that detectors composed of gauge-operator measurements are formed half as frequently as detectors composed of stabilizers, and so the former is less able to detect errors. Since the gauge-operator detectors arise from being near fabrication defects, they are already weak points in the code, and measuring them half as often as stabilizer detectors further penalizes performance of the quantum code.

In contrast to these previous attempts, the embodiments measure all gauge operators, both X-type and Z-type, in every cycle of measurement ("densely packed"). The embodiments accomplish these densely packed gauge operators by combing X-type gauge operators and Z-types gauge operators in specific ways to form detectors. The embodiments form gauge detectors when measuring gauge operators every cycle. The detectors sometimes require combining gauge operators that are staggered across different cycles of measurement. This staggering does not occur in the previous methods, where X-type and Z-type gauge operators are measured separately.

Figure 5:
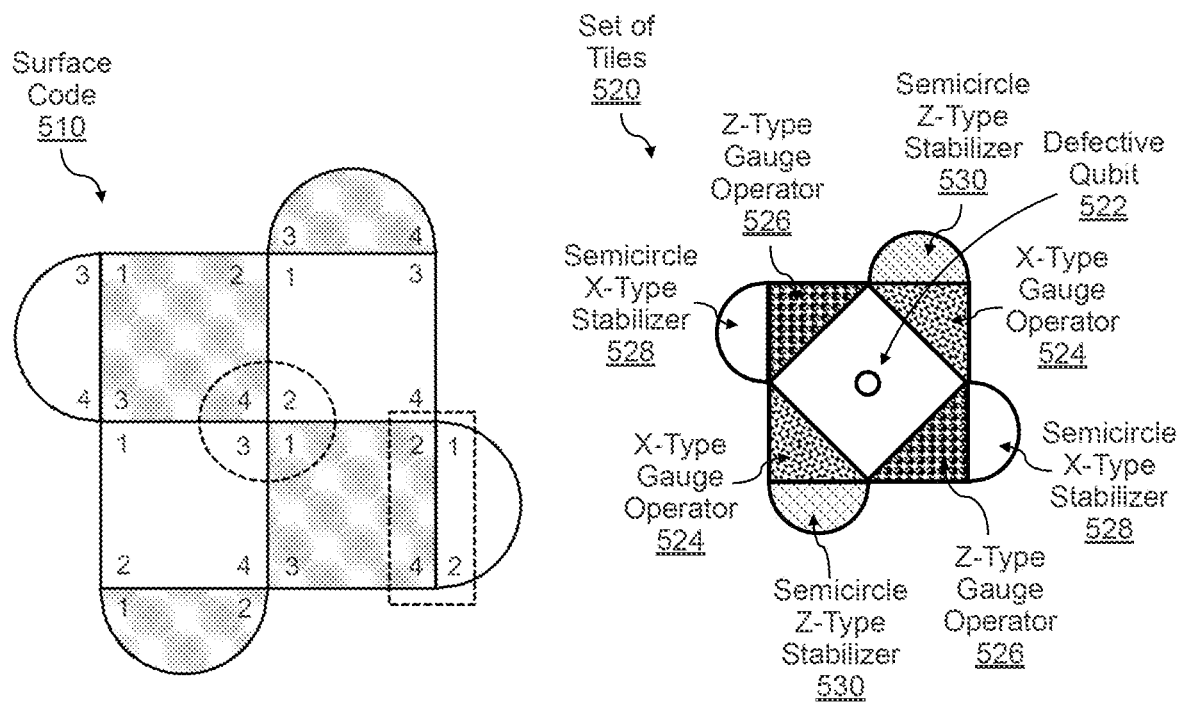
FIG. 5 provides a schematic view of a non-limiting example of forming a subsystem surface code when a defective qubit is present, according to various embodiments.
Figure 5:
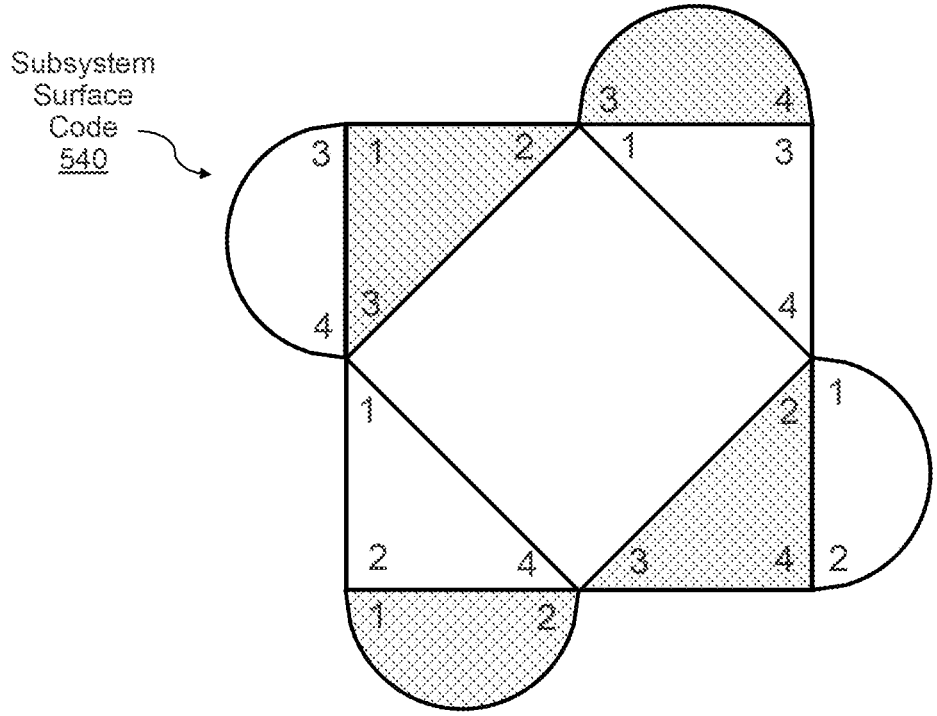

As noted throughout, the embodiments are directed towards implementing an error correcting code when broken or defective qubits are present in the 2D array of qubits. When a qubit is defective, a "subsystem" surface code (or simply a subsystem code) may be employed. FIG. 5 provides a schematic view of a non-limiting example of forming a subsystem surface code when a defective qubit is present, according to various embodiments. More particularly, FIG. 5 shows surface code 510. Surface code 510 may be similar to surface code 410 of FIGS. 4A-4B. Note that the global time positions of the data qubits of surface code 510 are shown in FIG. 5. As discussed in conjunction with FIGS. 4A-4B, the global time positions are valid, under the constraints of global time positions (e.g., no gate collisions occur in the ordering of "touching" the data qubits). Thus, surface code 510 may be referred to as a valid surface code. Assume that the "center" data qubit (e.g., the data qubit implied in the center of the dashed circle) is defective. Note that the valid surface code 510 is formed from 17 qubits: 9 data qubits and 8 measure qubits. Surface code 510 is comprised of four square stabilizers (e.g., two copies of a square Z-type stabilizer and two copies of a square X-type stabilizer) and four semicircle stabilizers (e.g., two copies of a semicircle Z-type stabilizer and two copies of a semicircle X-type stabilizers). Each of the eight measure qubits is associated with a separate stabilizer of the eight stabilizers. Each square stabilizer having four data qubits and each semicircle stabilizer having two data qubits, where each data qubit is associated with two or more stabilizers.

A set of tiles 520 may be constructed, mapping around a defective qubit 522 (e.g., shown explicitly in the set of tiles). The set of tiles 520 are formed by a combination of stabilizers and gauge operators, none of which includes the defective qubit 522. More specifically, the set of tiles 520 include two copies of a semicircle X-type stabilizer 528 and two copies of a semicircle Z-type stabilizer 530. The set of tiles 520 also includes two copies of a X-type gauge operator 524 and two copies of a Z-type gauge operator 526. Note that, in order to "map around" the defective qubit 522, the gauge operators 524/526 are constructed from triangular tiles. The 16 functioning (or non-defective) qubits (e.g., eight functioning data qubits and eight functioning measure qubits) of the stabilizers/gauge operators are implied in the set of tiles 520. Thus, comparing the set of tiles 520 to the valid surface code 510, the four square stabilizers (e.g., two copies of a square X-type stabilizer and two copies of a square Z-type stabilizer) have been replaced with four gauge operators (e.g., two copies of a triangular X-type gauge operator and two copies of a triangular Z-type gauge operator). The triangular gauge operators are formed by square stabilizers by mapping around (or "chopping off") the center defective qubit 522.

Since a circuit construction for measuring a stabilizer can also be applied to measure a gauge operator, it follows that gauge operators may have a circuit order (e.g., as indicated by valid global time positions for the remaining non-defective data qubits). A circuit order for a subsystem code using gauge-operator tiles is valid if it conforms to the same requirements for a valid circuit order for the surface code with only stabilizer tiles. That is, with the determination of valid global time positions for the eight remaining non-defective data qubits, a subsystem code 540 may be formed from the set of tiles 520. A quantum circuit may implement the subsystem surface code 540, based on the stabilizers, gauge operators, and valid global time positions for the data qubits. Subsystem surface code 540 includes valid global time positions for the eight non-defective data qubits, and thus subsystem surface code 540 shows a valid circuit order.

A general procedure for constructing a valid circuit order for a subsystem code is to start from valid circuit order for a surface code (e.g., valid surface code 510), and form gauge operators as needed by chopping data qubits from tiles, and keeping circuit-order numeric positions that remain. For example, the subsystem circuit order for the valid subsystem surface code 540 is derived by chopping away the center data qubit (e.g., the defective qubit 522) from the four square tiles of the valid surface code 510.

As a reminder, a detector is constructed from the parity of two consecutive measurements of the same stabilizer. In a subsystem code (e.g., subsystem surface code 540), gauge operators can be combined to form stabilizers, and hence a detector can be formed by composing two consecutive "composite" stabilizer measurements, composed of the correct combination of gauge operator measurements. The embodiments include a procedure for correctly combining gauge operator measurements for subsystem surface codes. Correctly combining gauge operator measurements has a connection to the circuit order of the gauge-operator tiles.

Because gauge operators do not always mutually commute, the "composed" stabilizer measurements produced from gauge-operator measurements may combine gauge-operator measurements from the correct location and time. Herein, "location" corresponds to the tile in a set of tiles that comprise the subsystem code (e.g., set of tiles 520). "Time" corresponds with which cycle of measurement in a quantum, where tiles are measured repeatably. Correct gauge-measurement combinations may sometimes come from cycles that depend on the locations of gauge tiles and their circuit order, as described below.

In the embodiments, gauge operator measurements may be grouped as follows. Given a subsystem code (e.g., subsystem surface code 540), first, the gauge operators may be identified and uniquely labelled. Next, a directed graph may be generated. In the directed graph, nodes are gauge-operator labels and edges are precedence of when a pair of non-commuting gauge operators touch a mutual (non-defective) data qubit. Finally, the directed graph may be traverses to assign a "cycle offset" to each gauge operator.

For the first above step, gauge operators may be identified by iterating over all tiles (e.g., in the set of tiles 520). For each tile, it is determined if the tile commutes with all of its adjacent tiles—meaning tiles with which it overlaps on at least one data qubit. When using X-type and Z-type tiles in a subsystem surface code, then two tiles do not commute if (a) one is X-type and the other is Z-type and (b) they overlap on exactly one data qubit. In this case, both such tiles can be employed to form two gauge operators (e.g., an X-type gauge operator and a Z-type gauge operator). In the set of tiles 520, there are four gauge operators (the triangles), because they each touch a neighboring triangle on one qubit, and the neighbors are of different type (e.g., the X-type triangle tiles touch a Z-type triangle tile).

Figure 6:
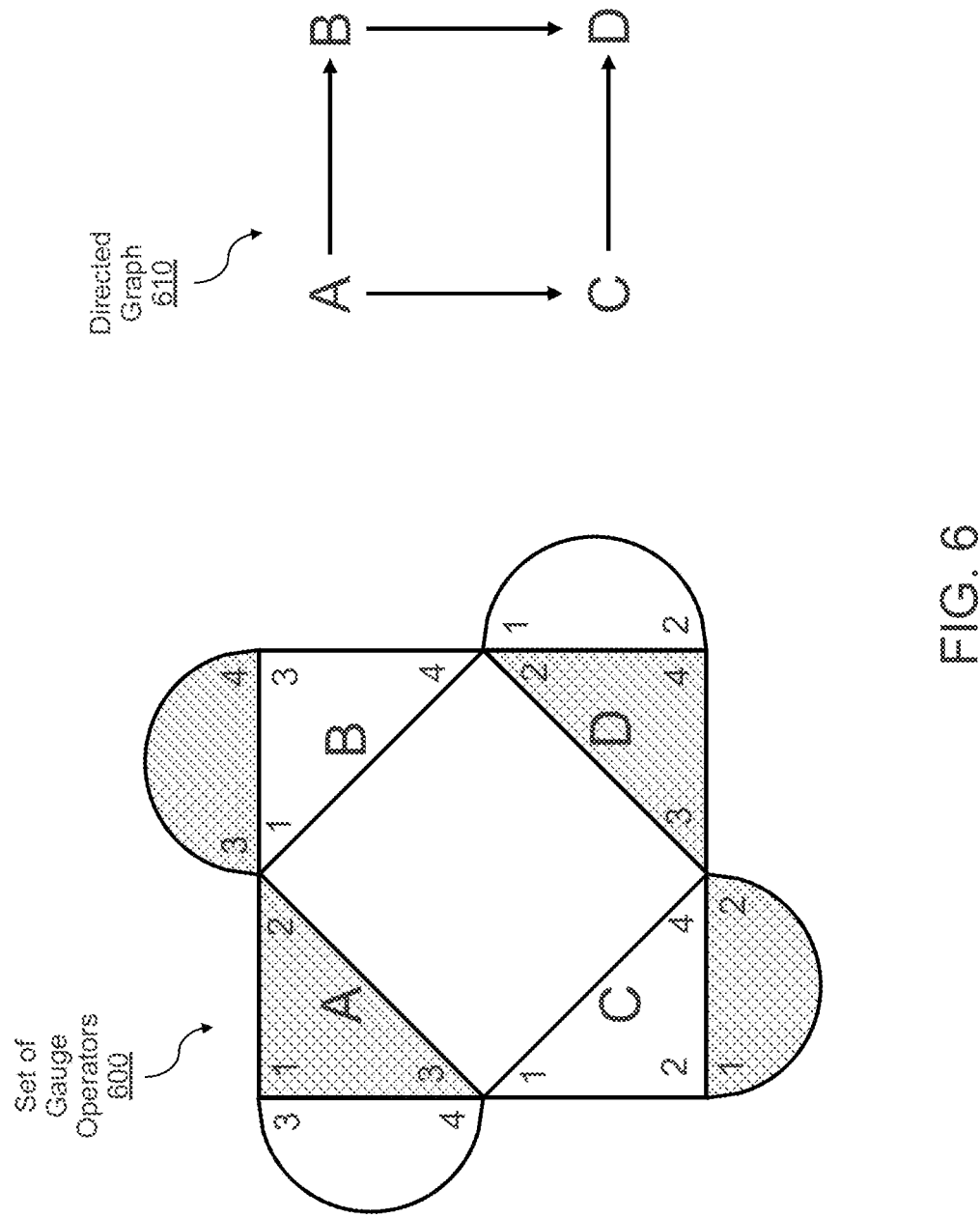
FIG. 6 shows a non-limiting example of labeling tiles and forming a directed graph, according to various embodiments.

FIG. 6 shows a non-limiting example of labeling tiles and forming a directed graph, according to various embodiments. More specifically, FIG. 6 shows a set of gauge of operators 600, formed via the set of tiles 520 of FIG. 5. Each gauge operator of the set of gauge operators 600 has been identified and labeled as discussed above. The gauge operators of the set of gauge operators 600 has been uniquely labeled as A, B, C, or D. The set of gauge operators 600 includes two X-type gauge operators (labeled as B and C) and the Z-type gauge operators (labeled as A and D). Note that the global time positions of the data qubits have been ported over from the "valid" surface code starting position (e.g., the surface code 510 of FIG. 5). After the gauge operators have been identified and labeled (e.g., see set of gauge operators 600), then a directed graph 610 may be generated. The nodes of the directed graph 610 correspond to the labels of the gauge operators (e.g., A, B, C, and D). After the nodes of the directed graph 610 are placed, a directed edge may be placed between two gauge-operator nodes where they overlap on the same data qubit. Using the circuit order (e.g., as indicated by the global time positions of the data qubits) to direct the edge from the tile that touches the data qubit later to the one that touches the data qubit earlier. For instance, the gauge operator A touches their shared (or common) data qubit after the gauge operator B touches their shared data qubit, thus a directed edge is drawn from gauge operator A to gauge operator B. Likewise, the gauge operator B touches their shared data qubit after the gauge operator D touches their shared data qubit, thus a directed edge is drawn from gauge operator B to gauge operator D. The gauge operator A touches their shared data qubit after the gauge operator C touches their shared data qubit, thus a directed edge is drawn from gauge operator A to gauge operator C. The gauge operator C touches their shared data qubit after the gauge operator D touches their shared data qubit, thus a directed edge is drawn from gauge operator C to gauge operator D.

Another constraint on valid circuit order (or equivalently, valid global time positions for the data qubits), is that the generated directed graph (e.g., directed graph 610) must not have any cycles. That is, the directed graph must not be a cyclic graph. As shown in FIG. 6, directed graph 610 has no cycles, and thus satisfies this constraint. A cycle detection algorithm may be employed to determine if the resulting directed graph has any cycles.

Figure 7A:
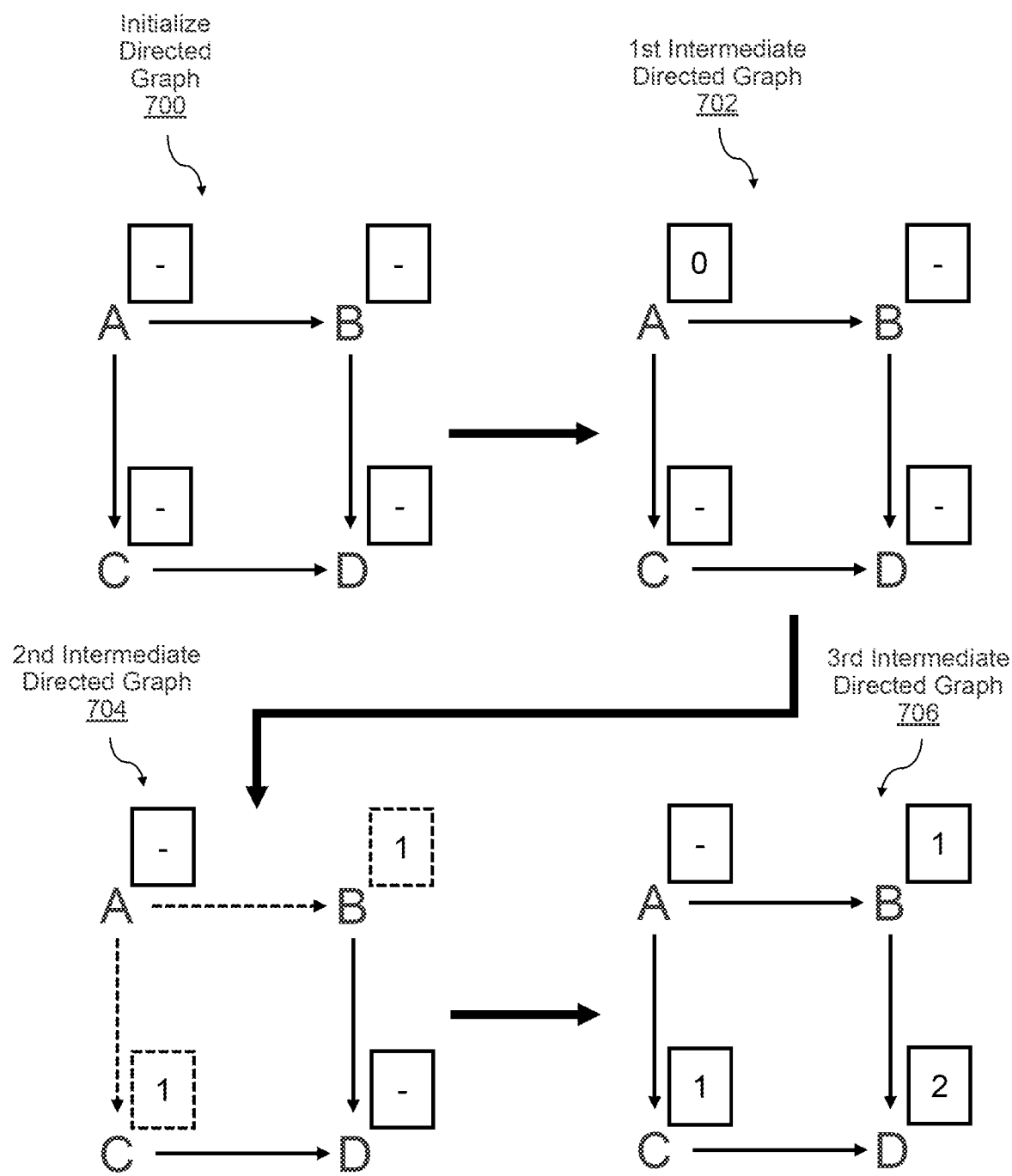
FIG. 7A shows steps for assigning nodes of a directed graph a cycle offset, according to various embodiments.

The next step in grouping gauge operator measurements includes traversing the directed graph an assigning a "cycle offset" to each gauge operator. That is, each node in the directed graph is associated with an integer (e.g., a cycle offset). FIG. 7A shows steps for assigning nodes of a directed graph a cycle offset, according to various embodiments. Before traversing the directed graph, all integer entries (for the nodes of the directed graph) are initialized to a sentinel value to indicate this node has not been visited by the search described below. FIG. 7A shows an initialized directed graph 700. In initialized directed graph 700, the sentinel is illustrated as '-' but could an unreachable large numeric value in practice (e.g. 1000000). The sentinels (or sentinel indicators) are shown in rectangular boxes next to their respective nodes. A sentinel next to a node indicates that the node is not yet visited in the graph traversal. As the cycle offsets are assigned to the nodes, the sentinels in the rectangular box next to the node are updated to an integer to indicate the cycle offset. The directed graph (e.g., initialized directed graph 700) may be divided into a set of connected components. Dividing the directed graph into a set of connected components may be performed via a standard algorithm. In this non-limiting example, the directed graph (e.g., the initialized directed graph 700) has only a single connected component, comprising the entirety of the initialized directed graph 700.

To continue to assign the nodes with cycle offsets, for each connected component of the directed graph, select a node and assign it the value of 0, as shown by the first intermediate directed graph 702. In some embodiments, this selection of a node may be subject to a random or pseudo-random process. In other embodiments, the selection of a node may be based on one or more heuristics, or a deterministic process. In the non-limiting example of first intermediate directed graph 702, node A (corresponding to a triangular Z-type gauge operator) is chosen as the initial node and the cycle offset is initially assigned to 0.

A breadth-first search algorithm may be performed from this initially selected node. To perform the breadth-first search algorithm, the directed edges may be treated as simple edges. For instance, the search need not be restricted to search in the directions of the edges (e.g., the search may treat each edge as bidirectional or directionless). As an edge is followed, if the edge points in the direction source→destination, the integer at destination node may be set to 1 higher than the integer at source node, as shown in the second intermediate directed graph 704 of FIG. 7A. Alternatively, if the edge points in the direction destination→source, set the integer at destination to 1 lower than the integer at source. In the non-limiting example of the second intermediate directed graph 704, the cycle offset of the B and C nodes have been both assigned a value of 1 (e.g., 1 higher than 0) because both B and C nodes are "destination" nodes, with respect to the source A node, which has already been assigned an offset cycle value of 0.

The process of traversing the directed graph and assigning the nodes a cycle offset is iterative. That is, this process is repeated to traverse the directed graph (e.g., each node of the directed graph is visited to assign it its offset cycle value). To repeat the process, select another node that had been visited on the last iteration. In this non-limiting example, either node B or node C may be selected (e.g., stochastically). Whichever selection is made, the D node is travelled to. Since the D node is the destination node, with respect to either the B node or the C node, the cycle offset value of the D node is assigned a value of 2, as shown in the third intermediate directed graph 706.

Next, the minimum value in the connected component may be found. Note that the minimum value in the connected component may be negative. So that all the integer values are non-negative, the value of all integers in the same connected component may be shifted by subtracting the minimum value for all integer values. This subtraction shifts all integers by the same amount to make the new minimum value zero. In the non-limiting example of FIG. 7A, since zero is the minimum value of the assigned cycle offsets, then no subtraction is required. Thus, the third intermediate directed graph 706 may become the final directed graph, where the integers in the boxes represent the final cycle offsets.

Figure 7B:
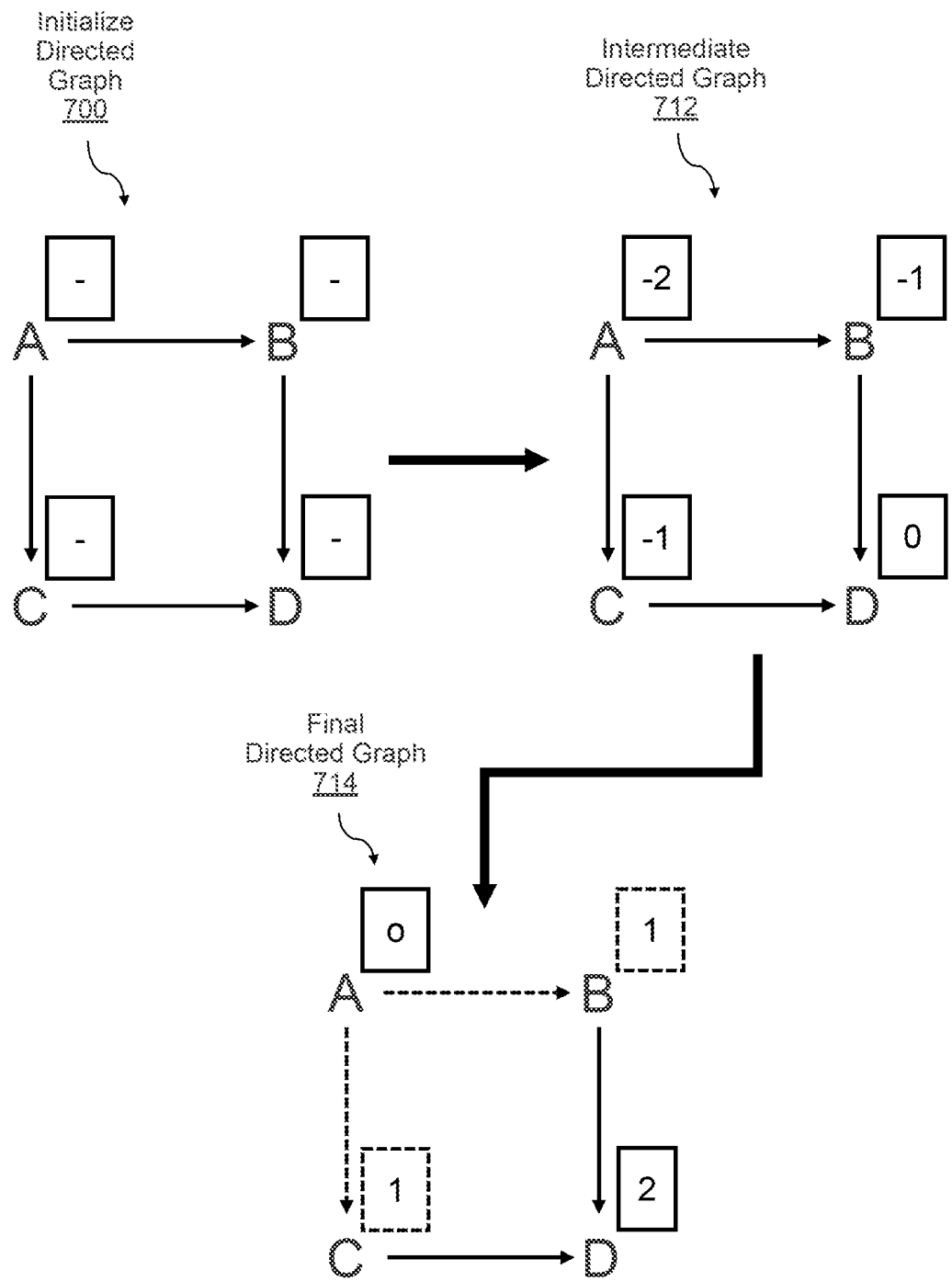
FIG. 7B shows an alternative selection of the initially selected node of FIG. 7A, according to various embodiments.

FIG. 7B shows an alternative selection of the initially selected node of FIG. 7A, according to various embodiments. More specifically, FIG. 7B shows that the final assignments of the cycle offsets for the nodes of a directed graph are insensitive to the initial selection (and subsequent selections) of the nodes to be visited. FIG. 7B shows initialized directed graph 700 from FIG. 7A. In the example of FIG. 7B, node D is initially selected as the node to begin the graph traversal, and thus it is initially assigned a cycle offset value of 0. Intermediate directed graph 712 shows the results of the cycle offset values after visiting each node in the graph traversal. The minimum cycle offset value of (−2) is assigned to node A. Based on the discussion above, all the cycle offset values may be shifted in the positive direction by a value by 2 (or shifted in the negative direction by a value of −2), resulting in the final directed graph 714. Note that the cycle offset values of the final directed graph 714 are equivalent to the cycle offset values of the third intermediate graph 708, which is also the final directed graph in FIG. 7A. Accordingly, the method of determining cycle offset values is independent of the initial node selection.

After finishing traversing the directed graph, the integer offset values may be updated. To update the offset values, within each connected component of the directed graph, the nodes can be divided into subsets that have odd or even integer values. This division separates X-type and Z-type stabilizers, though which subtype is odd or even can vary. A table of the nodes in each subset (even or odd) may be generated. In the table, an updated cycle offset value may be assigned to each node based on the previously assigned integer cycle offset value. The updated cycle offset value may be denoted as s, where for odd integer values x, the cycle offset value is updated as s=(x−1)/2. For even integer values y, the updated cycle offset is s=y/2.

After computing and updating the cycle offset values, detectors that are composed of gauge measurements can be generated. Each node of the directed graph corresponds to a gauge operator, and it has an associated cycle offset value. Denote these as (n, $s_n$) for node each node (n). There is a template for a detector resulting for each of the two subsets, for each connected component. For a given subset, the detector template may be expressed as detector=sum_n [Mn(t+sn)+Mn(t+sn+1)], where sum_n denotes parity combination (i.e. sum modulo 2). Mn(t) is the measurement of gauge operator n at time t, which is an integer corresponding to a repetition of measuring the stabilizer/gauge measurements associated with all tiles and sn is the cycle offset for gauge operator n previously computed. This detector expression is valid for all values of t where there exist gauge-operator measurements for the minimum time and the maximum time. As discussed below, cases where the template attempts to use measurement times that are not available ("time boundaries) may be handled in an alternative format.

As noted above, previous attempts to employ gauge operators do not perform X-type and Z-type measurements at the same time. Detectors arise from the subsets of connected components as before, but the formula is changed to: detector=sum_n [Mn(t)+Mn(t+2)]. Note that there is no need to compute cycle offsets, but the gauge-operator measurements are performed every other round instead of every round.

When operating a quantum code, eventually the stabilizer configuration will change to implement other logic such as logical measurement or logical gates. These scenarios may be denoted as time boundaries. Examples of time boundaries include logical-qubit initialization by performing reset on all data qubits in an appropriate Pauli basis, or logical-qubit measurement by performing measurement on all data qubits. Other examples include lattice surgery and logical-qubit movement. With a time boundary, the detector template can slide forward or backward in time by modifying the value of t in the following expression: detector=sum_n [Mn(t+sn)+Mn(t+sn+1)]. When some of the gauge-operator measurements do not exist (the time with offset is before the beginning or after the end of the repeating sequence of tile measurements), then an attempt to replace the missing measurements and form a modified detectors may be performed, as follows.

When t is sufficiently large or small such that neither Mn(t+sn) nor Mn(t+sn+1) exist, an attempt to form a detector may be performed by removing node n from the expression detector=sum_n [Mn(t+sn)+Mn(t+sn+1)]. This may be repeated for all other nodes in the detector template. If no nodes remain, a detector may not be formed.

When t is sufficiently large such that Mn(t+sn+1) does not exist, but Mn(t+sn) does exist, an attempt to form a detector may be performed by replacing Mn(t+sn) (e.g., in the expression detector=sum_n [Mn(t+sn)+Mn(t+sn+1)]) with a combination of other measurements or resets that were performed at such times that any operations touching the qubits in gauge operator n occurred before Mn(t+sn+1) in the quantum circuit. This substitution may be applied as needed to all nodes in the subset. For example, if all of the data qubits are measured at time t+sn+1 and in the same basis as gauge operator n, then Mn(t+sn+1) can be composed of a combination of measurements on the same data qubits.

When t is sufficiently small such that Mn(t+sn) does not exist, but Mn(t+sn+1) does exist, an attempt to form a detector may be performed by replacing Mn(t+sn) (e.g., in the expression detector=sum_n [Mn(t+sn)+Mn(t+sn+1)]) with a combination of other measurements or resets that were performed at such times that any operations touching the qubits in gauge operator n occurred before M (t+s+1) in the quantum circuit. This substitution may be applied as needed to all nodes in the subset. For example, if all of the data qubits are reset at time t+sn and in the same basis as gauge operator n, then Mn(t+sn) can be composed of a combination of the reset eigenvalues on the same data qubits. In this example, Mn(t+sn) is not replaced with measurement outcomes, but instead a parity offset of 0 or 1, depending on the combination of resets resulting in +1 or −1 eigenvalue for the gauge operator n.

Example Methods

Figure 8:
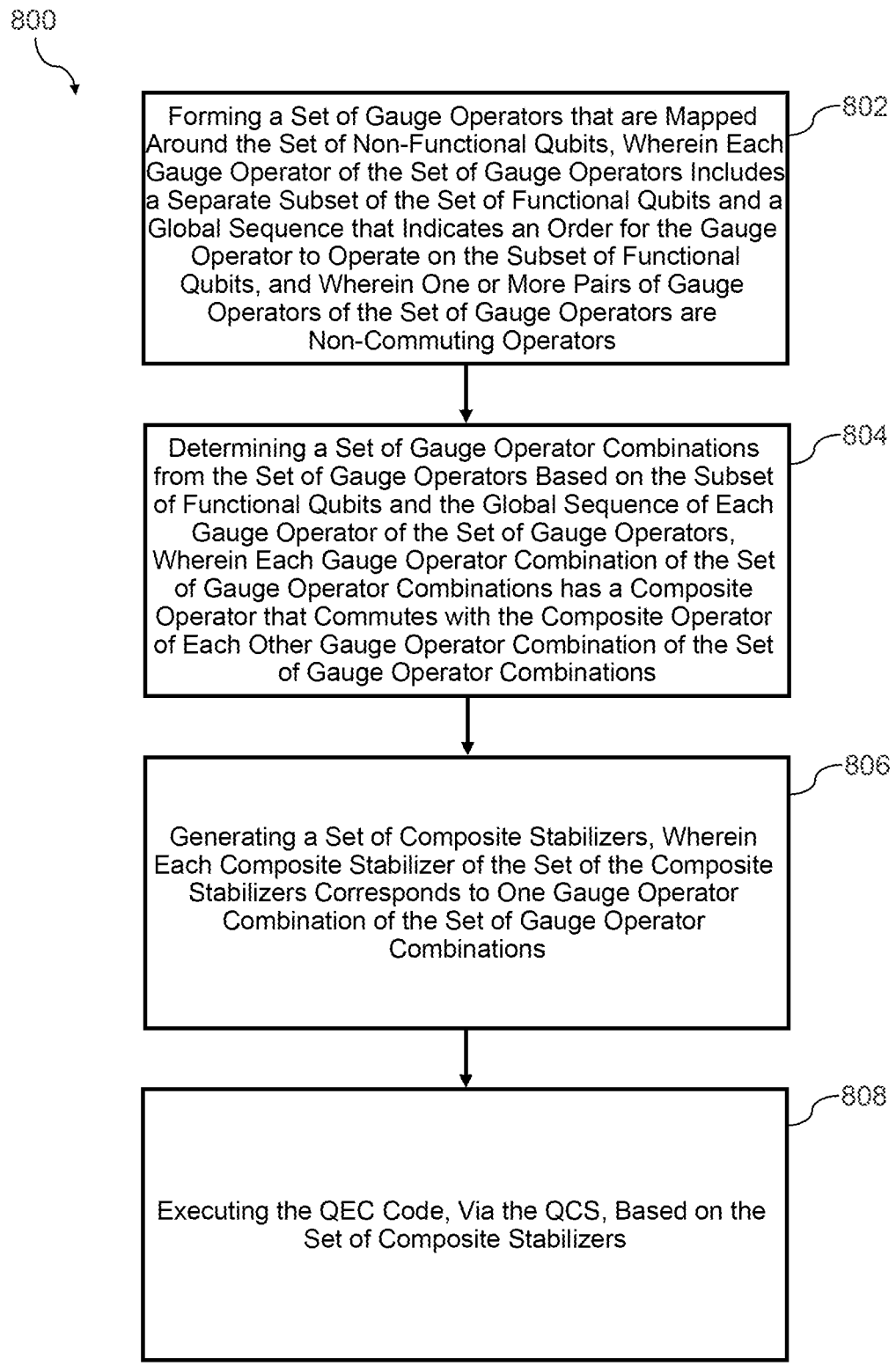
FIG. 8 depicts a flow chart diagram of an example method for implementing a quantum error correction code via a quantum computing device, according to various embodiments.

FIG. 8 depicts a flow chart diagram of an example method 800 for implementing a quantum error correction (QEC) code via a quantum computing device (QCS), according to various embodiments. The QCS may be similar to quantum computing system 100 of FIG. 1. Accordingly, the QCS includes a set of functional qubits and a set of non-functional qubits that is disjoint from the set of functional qubits.

Method 800 begins at block 802, a set of gauge operators that are mapped around the set of non-functional qubits are formed. Each gauge operator of the set of gauge operators includes a separate subset of the set of functional qubits and a global sequence that indicates an order for the gauge operator to operate on the subset of functional qubits. One or more pairs of gauge operators of the set of gauge operators are non-commuting operators.

At block 804, a set of gauge operator combinations are determined from the set of gauge operators. A gauge operator pair may include two or more gauge operators from the set of gauge operators (e.g., a first gauge operator and a second gauge operator). Determining the set of gauge operator combinations may be based on the subset of functional qubits and the global sequence of each gauge operator of the set of gauge operators. Each gauge operator combination has a composite operator that commutes with the composite operator of each other gauge operator combination of the set of gauge operator combinations. The composite operator of each gauge operator combination of the set of gauge operator combinations may be a product of each gauge operator of the gauge operator combination.

At block 806, a set of composite stabilizers may be generated. Each composite stabilizer of the set of the composite stabilizers corresponds to one gauge operator combination of the set of gauge operator combinations. At block 808, the QEC code may be executed, via the QCS, based on the set of composite stabilizers.

The set of qubits may be arranged in a 2D grid of qubits. In such embodiments, the method may further include constructing a set of tiles on the 2D grid of qubits. Each vertex of each tile of the set of tiles may correspond to a qubit of the set of qubits. The set of tiles includes a set of square tiles and a set of semicircle tiles. Each tile of the set of tiles corresponds to an X-type operator or a Z-type operator such that the set of square tiles forms a checkerboard pattern of X-type operators and Z-type operators. Each vertex of each tile of the set of tiles may be assigned a global time position based on a set of circuit constraints. The global sequence of each gauge operator of the set of gauge operators may be based on the global time position of each vertex of each tile of the set of tiles. The global sequence of each gauge operator may be indicative of the circuit control sequence for the quantum circuit that implements the QEC. When a vertex of a square tile corresponds to a non-functional qubit of the set of qubits, the square tile may be transformed to a triangular tile that is mapped around the non-functional qubit. For instance, a vertex of a square tile that corresponds to a non-functional qubit may be "cut" or "snipped," such that the square tile is mapped around the non-functional qubit and the square tile is transformed to a triangular tile. The formerly square tile is removed from the set of square tiles and a set of triangular tiles is constructed. Each triangular tile of the set of triangular tiles corresponds to a separate gauge operator of the set of gauge operators. It should be noted that the embodiments are not limited to scenarios where the square tile is limited to a single non-functional qubit, and the embodiments are generalizable to more than one non-functional qubit in a tile. For instance, when there are two or three non-functional qubits within a square tile, the square tile may be reduced to a "line" or "point."

A set of square stabilizers may be formed based on the set of square tiles and the global time position of each vertex of each square tile of the set of square tiles. A set of semicircle stabilizers may be formed based on the set of semicircle tiles and the global time position of each vertex of each semicircle tile of the set of semicircle tiles. The QEC code may be executed, via the QCS, further based on the set of square stabilizers and the set of semicircle stabilizers. The method may further include assigning each gauge operator of the set of gauge operators a cycle offset based on a breadth-first search of a directed graph generated from the set of triangular tiles. The set of composite detectors may be generated based on the cycle offset of each triangular tile of the set of triangular tiles.

The method for generation the circuit control sequence for the quantum circuit that implements the QEC may include assigning a unique label to each gauge operator of the set of gauge operators based on the correspondence of the gauge operator to a triangular tile of the set of triangular tiles. The directed graph may be generated based on the global sequence of each gauge operator of the set of gauge operators. The directed graph includes a set of nodes and a set of directed edges between nodes of the set of nodes. A determination of each directed edge of the set of directed edges is described below. Each node of the set of nodes corresponds to a separate gauge operator of the set of gauge operators and is labeled with the unique label of the corresponding gauge operator. The directed graph may be traversed. Traversing the directed graph includes visiting each node of the set of nodes via the set of directed edges. Each gauge operator of the set of gauge operators may be assigned the cycle offset based on a correspondence between a direction of traversal and a direction of each directed edge of the set of directed edges. The cycle offset of each gauge operator of the set off gauge operators may be updated based on a detector template and a parity of the cycle offset of the gauge operator.

It should be noted that embodiments may be generalized to any stabilizer measurements, including flags. As discussed throughout, the embodiments are based on the order in which quantum circuits touch the data qubits (e.g., the global sequence of a gauge operator that indicates an order for the gauge operator to operate on the subset of functional qubits). The embodiments may further be generalized to circumstances where stabilizers can be reconstructed from gauge operators and other stabilizers, resets, or measurements, such as in surface-code movement or lattice surgery. Tiles can have any labeling of time positions for touching data qubits. Tiles (and thus stabilizers and gauge operators) are not restricted to "X-type" and "Z-type". They can be generalized to anything locally equivalent to X-type and Z-type. Local equivalence means applying a transformation that is a single-qubit Clifford gate at each data qubit. It can be shown that this preserves pairwise commutation among stabilizers, pairwise commutation between any stabilizer and gauge operator, and commutation-or-not among pairs of gauge operators, e.g., X/Y surface codes and/or XZZX surface codes. The methods here generalize to other circuit decompositions that use a two-qubit entangling operation, such as the controlled-Z gate or two-qubit parity measurement.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qubits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc. . . .

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for implementing a quantum error correction (QEC) code on a quantum computing system (QCS), wherein the QCS comprises a set of functional qubits and a set of non-functional qubits, the method comprising:
   determining a set of gauge operator combinations from a set of gauge operators based on a global sequence for each gauge operator of the set of gauge operators;
   generating at least one composite stabilizer, wherein each composite stabilizer of the at least one composite stabilizer corresponds to a separate gauge operator combination of a set of gauge operator combinations; and
   executing the QEC code, via the QCS, based on the at least one composite stabilizer, wherein the global sequence for a gauge operator of the set of gauge operators indicates an order, that the gauge operator operates on the subset of functional qubits during the execution of the QEC code, the gauge operator is mapped around the set of non-functional qubits such that the QEC code avoids the set of non-functional qubits, and wherein executing the QEC code includes measuring, via readout devices of the QCS, at least a portion of the set of functional qubits.

2. The method of claim 1, further comprising:
   forming the set of gauge operators, wherein each gauge operator of the set of gauge operators includes a separate subset of the set of functional qubits and the global sequence that indicates an order for the gauge operator to operate on the subset of functional qubits, and wherein one or more pairs of gauge operators of the set of gauge operators are non-commuting operators; and
   determining the set of gauge operator combinations further based on the subset of functional qubits, wherein each gauge operator combination of the set of gauge operator combinations has a composite operator that commutes with the composite operator of each other gauge operator combination of the set of gauge operator combinations; and
   generating a set of composite stabilizers that includes the at least one composite stabilizer, wherein each composite stabilizer of the set of the composite stabilizers corresponds to a separate gauge operator combination of the set of gauge operator combinations.

3. The method of claim 2, wherein the composite operator of each gauge operator combination of the set of gauge operator combinations is a product of each gauge operator of the gauge operator combination.

4. The method of claim 2, wherein the QCS comprises a set of qubits that includes the set of functional qubits and the set of non-functional qubits and the set of qubits are arranged in a 2D grid of qubits.

5. The method of claim 4, further comprising:
   constructing a set of tiles on the 2D grid of qubits, wherein each vertex of each tile of the set of tiles corresponds to a qubit of the set of qubits, the set of tiles including a set of square tiles and a set of semicircle tiles, and each tile of the set of tiles corresponding to an X-type operator or a Z-type operator such that the set of square tiles forms a checkerboard pattern of X-type operators and Z-type operators;
   assigning each vertex of each tile of the set of tiles a global time position based on a set of circuit constraints; and
   when a vertex of a square tile corresponds to a non-functional qubit of the set of qubits, transforming the square tile to a triangular tile that is mapped around the non-functional qubit such that the square tile is removed from the set of square tiles and a set of triangular tiles is constructed, wherein each triangular tile of the set of triangular tiles corresponds to a separate gauge operator of the set of gauge operators.

6. The method of claim 5, wherein the global sequence of each gauge operator of the set of gauge operators is based on the global time position of each vertex of each tile of the set of tiles.

7. The method of claim 5, further comprising:
   forming a set of square stabilizers based on the set of square tiles and the global time position of each vertex of each square tile of the set of square tiles;

forming a set of semicircle stabilizers based on the set of semicircle tiles and the global time position of each vertex of each semicircle tile of the set of semicircle tiles; and executing the QEC code, via the QCS, further based on the set of square stabilizers and the set of semicircle stabilizers.

8. The method of claim 5, further comprising:

assigning each gauge operator of the set of gauge operators a cycle offset based on a breadth-first search of a directed graph generated from the set of triangular tiles; and generating the set of composite detectors based on the cycle offset of each triangular tile of the set of triangular tiles.

9. The method of claim 8, further comprising:

assigning a unique label to each gauge operator of the set of gauge operators based on the correspondence of the gauge operator to a triangular tile of the set of triangular tiles; and generating the directed graph based on the global sequence of each gauge operator of the set of gauge operators, wherein the directed graph includes a set of nodes and a set of directed edges between nodes of the set of nodes, and wherein each node of the set of nodes corresponds to a separate gauge operator of the set of gauge operators and is labeled with the unique label of the corresponding gauge operator.

10. The method of claim 9, wherein assigning each gauge operator of the set of gauge operators the cycle offset comprises:

traversing the directed graph, wherein traversing the directed graph includes visiting each node of the set of nodes via the set of directed edges; and assigning each gauge operator of the set of gauge operators the cycle offset based on a correspondence between a direction of traversal and a direction of each directed edge of the set of directed edges.

11. A quantum computing system, comprising:

a set of qubits that includes a set of functional qubits and a set of non-functional qubits;

one or more processor devices;

one or more memory devices, the one or more memory devices storing computer-readable instructions that when executed by the one or more processor devices cause the one or more processor devices to perform operations for implementing a quantum error correction (QEC) code, the operations comprising:

determining a set of gauge operator combinations from a set of gauge operators based on a global sequence for each gauge operator of the set of gauge operators;

generating at least one composite stabilizer, wherein each composite stabilizer of the at least one composite stabilizer corresponds to a separate gauge operator combination of a set of gauge operator combinations; and executing the QEC code, via the QCS, based on the at least one composite stabilizer, wherein the global sequence for a gauge operator of the set of gauge operators indicates an order, that the gauge operator operates on the subset of functional qubits during the execution of the QEC code, the gauge operator is mapped around the set of non-functional qubits such that the QEC code avoids the set of non-functional qubits, and wherein executing the QEC code includes measuring, via readout devices of the QCS, at least a portion of the set of functional qubits.

12. The quantum computing system of claim 11, the operations further comprising:

forming the set of gauge operators, wherein each gauge operator of the set of gauge operators includes a separate subset of the set of functional qubits and the global sequence that indicates an order for the gauge operator to operate on the subset of functional qubits, and wherein one or more pairs of gauge operators of the set of gauge operators are non-commuting operators; and determining the set of gauge operator combinations further based on the subset of functional qubits, wherein each gauge operator combination of the set of gauge operator combinations has a composite operator that commutes with the composite operator of each other gauge operator combination of the set of gauge operator combinations; and generating a set of composite stabilizers that includes the at least one composite stabilizer, wherein each composite stabilizer of the set of the composite stabilizers corresponds to a separate gauge operator combination of the set of gauge operator combinations.

13. The quantum computing system of claim 12, wherein the composite operator of each gauge operator combination of the set of gauge operator combinations is a product of each gauge operator of the gauge operator combination.

14. The quantum computing system of claim 12, wherein the set of qubits are arranged in a 2D grid of qubits.

15. The quantum computing system of claim 14, the operations further comprising:

constructing a set of tiles on the 2D grid of qubits, wherein each vertex of each tile of the set of tiles corresponds to a qubit of the set of qubits, the set of tiles including a set of square tiles and a set of semicircle tiles, and each tile of the set of tiles corresponding to an X-type operator or a Z-type operator such that the set of square tiles forms a checkerboard pattern of X-type operators and Z-type operators;

assigning each vertex of each tile of the set of tiles a global time position based on a set of circuit constraints; and when a vertex of a square tile corresponds to a non-functional qubit of the set of qubits, transforming the square tile to a triangular tile that is mapped around the non-functional qubit such that the square tile is removed from the set of square tiles and a set of triangular tiles is constructed, wherein each triangular tile of the set of triangular tiles corresponds to a separate gauge operator of the set of gauge operators.

16. The quantum computing system of claim 15, wherein the global sequence of each gauge operator of the set of gauge operators is based on the global time position of each vertex of each tile of the set of tiles.

17. The quantum computing system of claim 16, the operations further comprising:

forming a set of square stabilizers based on the set of square tiles and the global time position of each vertex of each square tile of the set of square tiles;

forming a set of semicircle stabilizers based on the set of semicircle tiles and the global time position of each vertex of each semicircle tile of the set of semicircle tiles; and executing the QEC code, via the QCS, further based on the set of square stabilizers and the set of semicircle stabilizers.

18. The quantum computing system of claim 15, the operations further comprising:
  assigning each gauge operator of the set of gauge operators a cycle offset based on a breadth-first search of a directed graph generated from the set of triangular tiles; and
  generating the set of composite detectors based on the cycle offset of each triangular tile of the set of triangular tiles.

19. The quantum computing system of claim 18, the operations further comprising:
  assigning a unique label to each gauge operator of the set of gauge operators based on the correspondence of the gauge operator to a triangular tile of the set of triangular tiles; and
  generating the directed graph based on the global sequence of each gauge operator of the set of gauge operators, wherein the directed graph includes a set of nodes and a set of directed edges between nodes of the set of nodes, and wherein each node of the set of nodes corresponds to a separate gauge operator of the set of gauge operators and is labeled with the unique label of the corresponding gauge operator.

20. The quantum computing system of claim 19, wherein assigning each gauge operator of the set of gauge operators the cycle offset comprises:
  traversing the directed graph, wherein traversing the directed graph includes visiting each node of the set of nodes via the set of directed edges; and
  assigning each gauge operator of the set of gauge operators the cycle offset based on a correspondence between a direction of traversal and a direction of each directed edge of the set of directed edges.

* * * * *